US012720421B2

(12) United States Patent
Munoz-Sanchez et al.

(10) Patent No.: US 12,720,421 B2
(45) Date of Patent: Aug. 25, 2026

(54) SYSTEMS AND METHODS FOR PRIVATE NETWORK MANAGEMENT

(71) Applicant: Verizon Patent and Licensing Inc., Basking Ridge, NJ (US)

(72) Inventors: Hugo D Munoz-Sanchez, Bedminster, NJ (US); Abdessamad Krieche, Milford, MA (US); Landon W Stogner, Flower Mound, TX (US); Francisco A Varela, Union, NJ (US); Maria C Halili Zaballero, Ramsey, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 881 days.

(21) Appl. No.: 17/944,612

(22) Filed: Sep. 14, 2022

(65) Prior Publication Data

US 2024/0089846 A1 Mar. 14, 2024

(51) Int. Cl.

*H04W 48/18* (2009.01)
*H04W 48/08* (2009.01)
*H04W 72/04* (2023.01)
*H04W 72/51* (2023.01)

(52) U.S. Cl.

CPC .......... *H04W 48/18* (2013.01); *H04W 48/08* (2013.01); *H04W 72/51* (2023.01)

(58) Field of Classification Search

CPC ...... H04W 48/18; H04W 48/08; H04W 72/51
See application file for complete search history.

(56) References Cited

U.S. PATENT DOCUMENTS

2006/0104263 A1* 5/2006 Krishnan .............. H04L 67/306 370/352

OTHER PUBLICATIONS

G.P. Eleftherladis et al., 'User Profile Identification in Future Mobile Telecommunications Systems', Sep./Oct. 1994, IEEE Network, pp. 33-39. (Year: 1994).*

* cited by examiner

*Primary Examiner* — Melvin C Marcelo

(57) ABSTRACT

One or more computing devices, systems, and/or methods for managing security associated with applications are provided. In an example, service allocation information associated with a plurality of private network sites of a private network associated with an entity may be received. Based upon the service allocation information, service profiles associated with a first user equipment (UE) may be determined. The service profiles include a first service profile of wireless communication services accessible to the first UE via a first private network site of the plurality of private network sites and a second service profile of wireless communication services accessible to the first UE via a second private network site of the plurality of private network sites. The first service profile, associated with the first UE, is transmitted to the first private network site. The second service profile, associated with the first UE, is transmitted to the second private network site.

20 Claims, 10 Drawing Sheets

SYSTEMS AND METHODS FOR PRIVATE NETWORK MANAGEMENT

BACKGROUND

Wireless communication services, such as cellular services, wireless internet services, etc. may be used by organizations, companies, universities and other entities to interconnect people, machines, vehicles, sensors and other devices. Controlled authorized user access and device management may be necessary for privacy and security.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
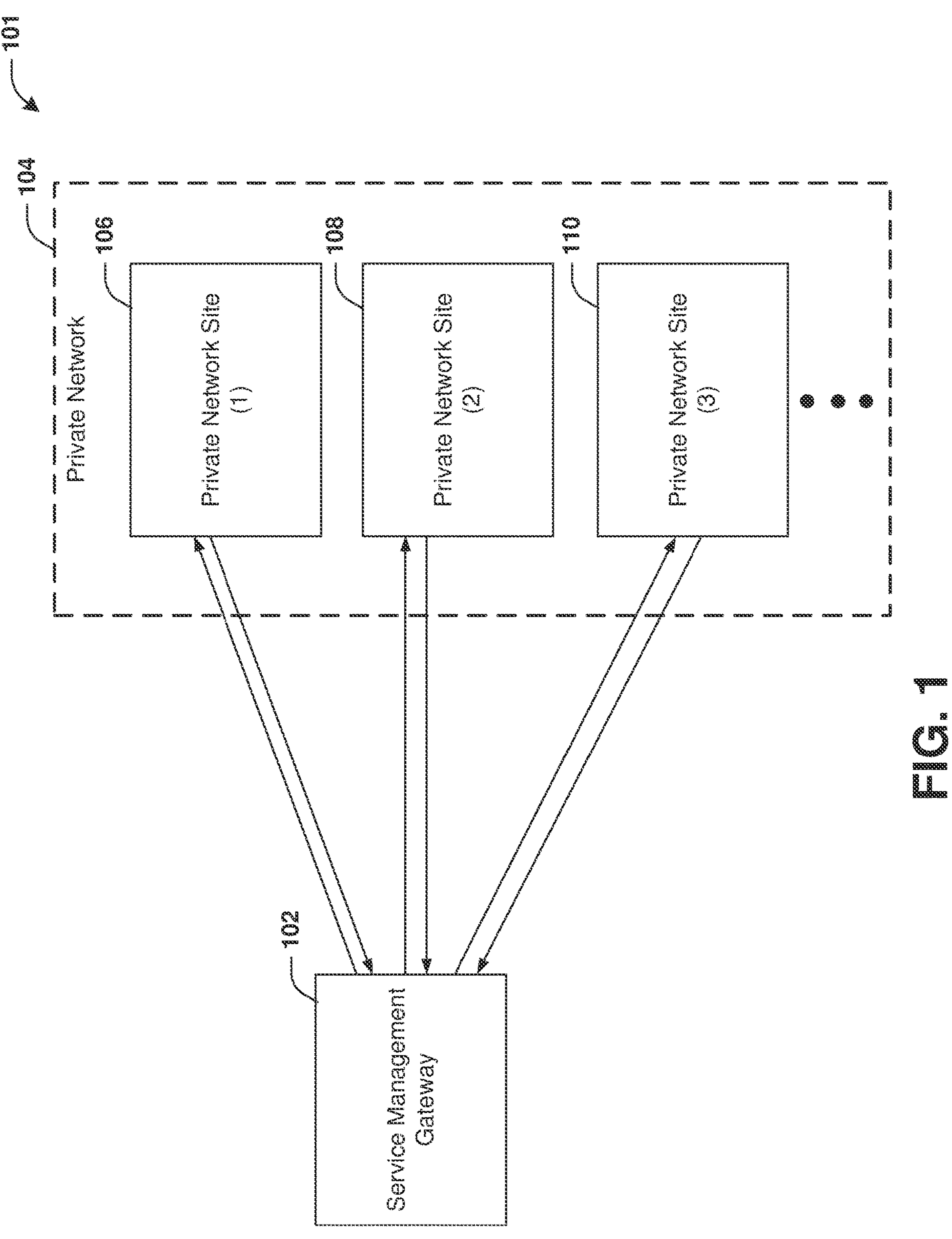
FIG. 1 is a diagram illustrating an example system comprising a service management gateway and/or a plurality of private network sites of a private network associated with an entity in accordance with an embodiment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for managing private network sites using a service management gateway are provided. Many entities (e.g., organizations, businesses, universities, and other entities) need private networks for their industry specific data and communication needs and/or to meet certain security requirements. For example, a private network site may be deployed at a facility of an entity to provide wireless communication services to authorized user equipments (UEs) associated with people (e.g., customers and/or workers of a business, students and/or teachers of a university, etc.), machines, vehicles, sensors and/or other devices. By deploying the private network site at the facility, wireless communication services provided to the authorized UEs may be controlled based on requirements of the entity (e.g., Quality of Service (QoS) requirements, speed requirements, security requirements, etc.). However, the entity may want to provide coverage to multiple geographically distributed facilities of the entity (e.g., various facilities in different regions, such as different campuses of a university, different business locations of a company, etc.). It may be difficult to separately and/or independently implement and/or manage various private network sites at the facilities of the entity.

Accordingly, as provided herein, a service management gateway (e.g., a subscriber management gateway) may manage a plurality of private network sites of a private network associated with an entity. For example, the service management gateway may determine service profiles of UEs that are authorized to access wireless communication services of private network sites of the private network, and may provision the service profiles to corresponding network sites. The service profiles may indicate different priorities, different QoSs, different speeds, and/or different levels of access for different UEs according to specifications provided by the entity. For example, based upon requirements for different UEs, service profiles may be provisioned to a private network site such that a first UE is provided with at least one of a higher priority, a higher QoS, a higher speed, a higher level of access, etc. than a second UE. Further, the same UE may be provided with access to one, some and/or all network sites of the plurality of private network sites associated with the entity, where the service profiles may be configured and/or provisioned such that the UE is provided with a higher priority, a higher QoS, a higher speed, a higher level of access, etc. on a home private network site of the UE than on secondary private network sites. In a centralized manner, the service management gateway may automatically determine service profiles of UEs based upon service allocation information (provided by the entity, for example), and/or may automatically provision the service profiles to the plurality of private network sites, thereby providing for automatic control of access provided to connected UEs. Accordingly, implementation of the techniques herein may provide for reduced manual effort, improved security and/or improved privacy compared to systems that require independent and/or separate configuration of different private network sites for the entity. Alternatively and/or additionally, in a coordinated and/or synchronized manner, the service management gateway may provide automatic reconciliation of private network sites (such as by automatically correcting profile data stores of the plurality of private network sites), clear stale wireless communication sessions of the plurality of private network sites with inactive UEs, detect malicious activity on the plurality of private network sites, and/or blacklist detected malicious UEs.

FIG. 1 illustrates an example of a system 101 comprising a service management gateway 102 (e.g., a subscriber management gateway) and/or a plurality of private network sites of a private network 104 associated with an entity. In an example, the entity may be an enterprise, an organization, a company, a business, a school, a university, etc. that is provided with wireless services via the plurality of private network sites. The wireless services may be provided by a wireless service provider (e.g., the wireless service provider may deploy the plurality of private network sites and/or maintain the plurality of private network sites in exchange for compensation from the entity). The wireless services for the entity may comprise at least one of cellular service (e.g., 5G service, 4G service and/or other type of cellular service), internet service (e.g., cellular internet service, 5G internet service, 4G internet service, satellite internet service, and/or other type of internet service), messaging service, etc.

The plurality of private network sites may comprise a first private network site 106, a second private network site 108, a third private network site 110, etc. Wireless services provided by the first private network site 106 may be accessible to UEs associated with the entity, such as UEs authorized by the entity, and may be limited and/or blocked for other UEs that are not authorized by the entity. In an example, the first private network site 106 may provide authorized UEs with wireless services that are at least one of higher speed, higher capacity, lower latency, etc. as compared to wireless services provided by the first private network site 106 for unauthorized UEs (e.g., guest users). Alternatively and/or additionally, the first private network site 106 may provide authorized UEs with wireless access to one or more resources (e.g., resources of the private network and/or the first private network site 106) that are not accessible to the unauthorized UEs. The first private network site 106 may be deployed in a facility (e.g., with indoor spaces and/or outdoor spaces) associated with the entity. In an example, the entity may be a university, the facility may correspond to a campus and/or building of the university and/or the first private network site 106 may be used to provide wireless services to UEs (e.g., phones, laptops, cameras, internet of things (IOT) devices, tablets, sensors, robots, etc.) belonging to at least one of the university, professors of the university, students of the university, etc.

In some examples, private network sites of the plurality of private network sites may be associated with different coverage areas (e.g., coverage areas distributed geographically). For example, the first private network site 106 may provide telecommunication services to one or more UEs in a first coverage area, the second private network site 108 may provide telecommunication services to one or more UEs in a second coverage area, the third private network site 110 may provide telecommunication services to one or more UEs in a third coverage area, etc. In an example, the first coverage area, the second coverage area, the third coverage area, etc. may correspond to at least one of different campuses, different buildings, etc. associated with the entity.

In some examples, the service management gateway 102 may communicate with private network sites of the plurality of private network sites to manage services provided by the private network sites to UEs (e.g., authorized UEs) associated with the entity. In an example, the service management gateway 102 may at least one of: inform private network sites of authorized UEs, inform the private network sites of services to provide for the UEs, update service profiles stored on the plurality of private network sites, respond to service queries from private network sites of the plurality of private network sites, check for and/or detect malicious activity (e.g., fraud, Subscriber Identity and/or Identification Module (SIM) cloning, etc.), etc.

Figure 2:
FIG. 2 is a flow chart illustrating an example method for managing private network sites in accordance with an embodiment.
Figure 2:
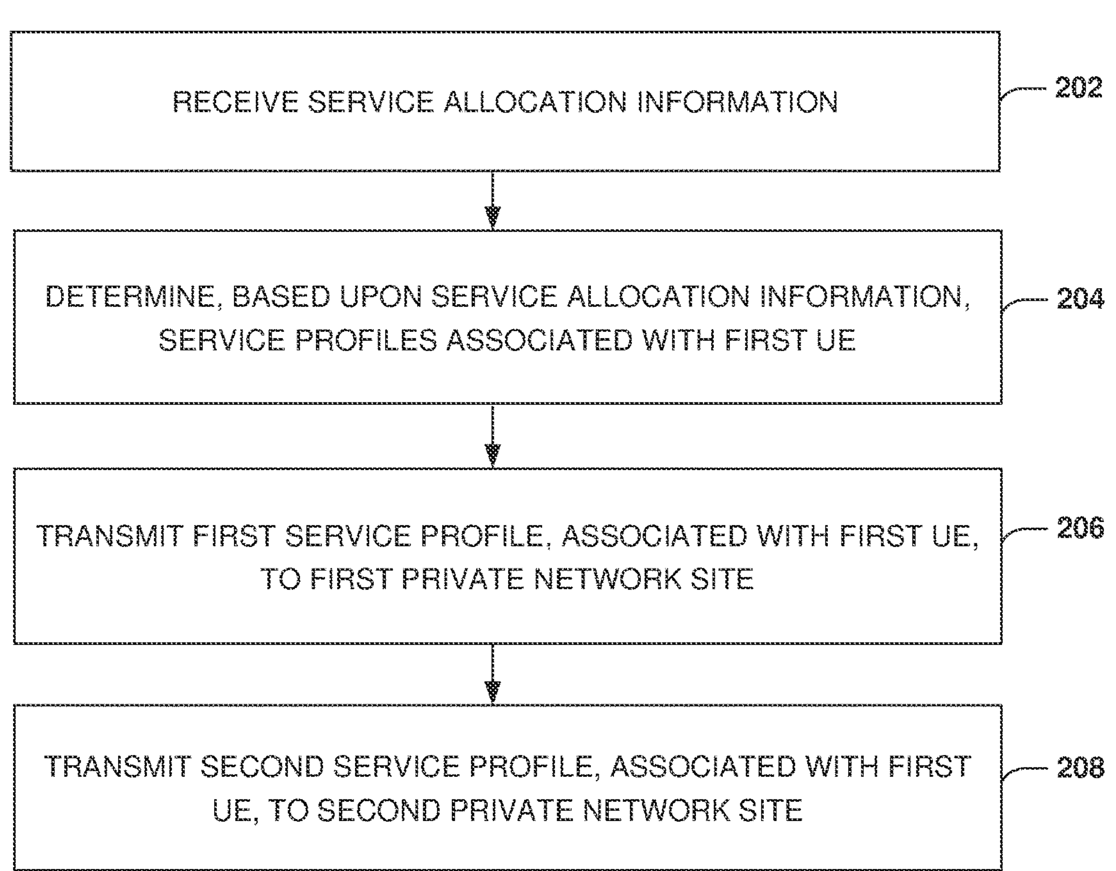
Figure 3:
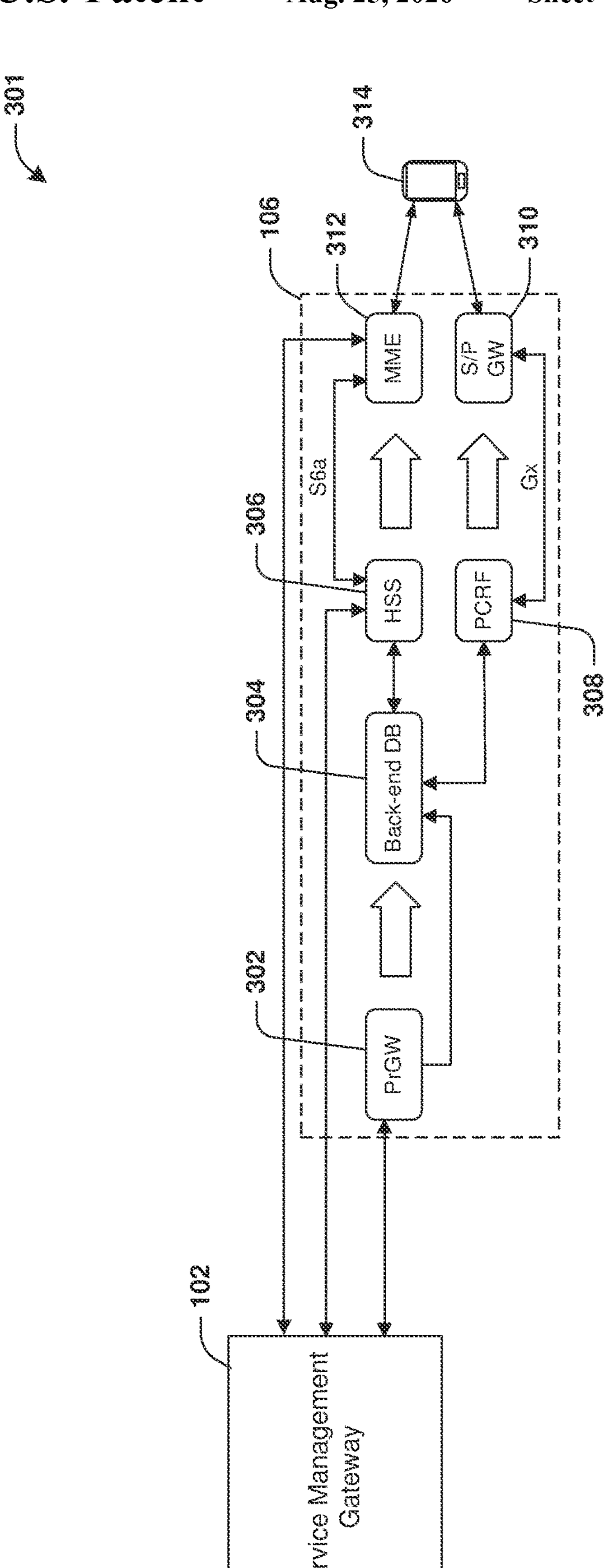
FIG. 3 is a diagram illustrating an example system comprising a private network site, a service management gateway and/or a user equipment (UE) in accordance with an embodiment.

An embodiment of managing the plurality of private network sites is illustrated by an example method 200 of FIG. 2, and is further described in conjunction with FIGS. 1 and 3. At 202, the service management gateway 102 may receive service allocation information associated with the plurality of private network sites of the private network 104 associated with the entity. For example, the service allocation information may be received from a dashboard system of the wireless service provider. In some examples, the dashboard system may comprise a system (e.g., a business support system (BSS)) that allows customers (e.g., enterprise customers) to manage their private network deployments. The dashboard system may provide provisioning, fulfillment and/or key performance indicator (KPI) monitoring of the private network 104. The service allocation information may be received in an onboarding process for configuring the private network 104 and/or the plurality of private network sites and/or for defining at least one of authorized UEs, service levels of authorized UEs, etc. of private network sites of the plurality of private network sites. In an example, the service allocation information may be indicative of entity information associated with the entity and/or sets of UE information associated with a plurality of UEs (e.g., UEs that are authorized to access wireless services of one or more private network sites of the plurality of private network sites).

The entity information may be indicative of an entity identifier associated with the entity (e.g., an enterprise ID of the entity). In an example, the sets of UE information may comprise a first set of UE information associated with a first UE (that is authorized to access wireless services of one or more private network sites of the plurality of private network sites, for example), a second set of UE information associated with a second UE (that is authorized to access wireless services of one or more private network sites of the plurality of private network sites, for example), a third set of UE information associated with a third UE (that is authorized to access wireless services of one or more private network sites of the plurality of private network sites, for example), etc. The first set of UE information may comprise (i) a UE identifier associated with the first UE, (ii) one or more private network sites, of the plurality of private network sites, that the first UE is authorized to access, (iii) for each private network site of the one or more private network sites, one or more characteristics (e.g., a level of service) of wireless services accessible to the first UE on the private network site, etc. In an example, the UE identifier may comprise SIM information associated with the first UE, such as an international mobile subscriber identity (IMSI) number stored on a SIM card of the first UE and/or a key, associated with the IMSI number, stored on the SIM card of the first UE. The service allocation information may be configured to satisfy wireless service requirements of the entity.

At 204, the service management gateway 102 may determine, based upon the service allocation information, a first set of service profiles associated with the first UE. For example, the first set of service profiles (e.g., a set of one or more service profiles) may comprise at least one of a first service profile associated with the first UE and the first private network site 106 (e.g., the first private network site 108 may be a private network site of the one or more private network sites that the first UE is authorized to access), a second service profile associated with the first UE and the second private network site 108 (e.g., the second private network site 108 may be a private network site of the one or more private network sites that the first UE is authorized to access), etc. The first service profile may be indicative of wireless communication services accessible to the first UE via the first private network site.

The first service profile may be indicative of (i) the UE identifier associated with the first UE, (ii) a first priority of wireless communication service for the first UE (e.g., the first private network site 106 may prioritize wireless services to the first UE over wireless services to other UEs that are associated with priorities lower than the first priority), (iii) a first Quality of Service (QoS) of wireless communication service for the first UE (e.g., wireless services provided by the first private network site 106 for the first UE may meet the first QoS), (iv) a first speed of wireless communication service for the first UE, (v) a first level of access, of the first UE, to resources (e.g., resources of the first private network site 106 and/or the private network 104) using the first private network site 106 (e.g., the first level of access may be indicative of one or more resources, of the first private network site 106 and/or the private network 104, that the first UE is authorized to access using the first private network site 106), and/or (vi) other information associated with services accessible to the first UE via the first private network site 106.

The second service profile may be indicative of (i) the UE identifier associated with the first UE, (ii) a second priority of wireless communication service for the first UE, (iii) a second QoS of wireless communication service for the first UE, (iv) a second speed of wireless communication service for the first UE, (v) a second level of access, of the first UE, to resources using the second private network site 108, and/or (vi) other information associated with services accessible to the first UE via the second private network site 108.

In some examples, wireless services accessible to the first UE may differ across the one or more private network sites that the first UE is authorized to access. For example, the first service profile may be different than the second service profile. In an example, the first priority may be different than the second priority. Alternatively and/or additionally, the first QoS may be different than the second QoS. Alternatively and/or additionally, the first speed may be different than the second speed. Alternatively and/or additionally, the first level of access may be different than the second level of access. For example, the first UE may be authorized to access first resources (e.g., first data, one or more first applications, etc.) using the first private network site 106 and second resources (e.g., second data, one or more second applications, etc.) using the second private network site 108, where the first resources are different than the second resources. In an example, the first resources may be stored on one or more first computers (e.g., one or more first servers) accessible via the first private network site 106. The second resources may be stored on one or more second computers (e.g., one or more second servers) accessible via the second private network site 108.

In some examples, a private network site of the plurality of private network sites may be designated a home private network site of the first UE. For example, the home private network site may correspond to a private network site, of the plurality of private network sites, that the first UE mainly uses and/or that the first UE is expected to mainly use. The first UE may have a higher level of service (e.g., at least one of higher priority, higher speed, higher QoS, higher level of access, etc.) at the home private network site than at other private network sites. Other private network sites (other than the home private network site) of the one or more private network sites that the first UE is authorized to access may be designated secondary private network sites. In an example, the first private network site 106 may be designated a home private network site of the first UE, and the second private network site 108 may be designated a secondary private network site of the first UE. Accordingly, a higher level of service (e.g., at least one of higher priority, higher speed, higher QoS, higher level of access, etc.) may be accessible to the first UE via the first private network site 106 than via the second private network site 108. For example, at least one of the first priority, the first QoS, the first speed, the first level of access, etc. indicated by the first service profile may be higher than at least one of the second priority, the second QoS, the second speed, the second level of access, etc. indicated by the second service profile, respectively.

In some examples, for each UE of the plurality of UEs (e.g., authorized UEs of one or more private network sites of the plurality of private network sites), the service management gateway 102 may determine a set of service profiles (e.g., a set of one or more service profiles), such as using one or more of the techniques provided herein with respect to determining the first set of service profiles associated with the first UE. For example, the service management gateway 102 may determine at least one of a second set of service profiles associated with the second UE, a third set of service profiles associated with the third UE, etc.

The service management gateway 102 may provision service profiles of the plurality of UEs to private network sites of the plurality of private network sites. For example, a first plurality of service profiles associated with the first private network site 106 may be transmitted to the first private network site 106 (e.g., the first plurality of service profiles may comprise service profiles associated with UEs, of the plurality of UEs, that are authorized to access services of the first private network site 106, where the service profiles are indicative of wireless communication services accessible to the UEs via the first private network site 106), a second plurality of service profiles associated with the second private network site 108 may be transmitted to the second private network site 108 (e.g., the second plurality of service profiles may comprise service profiles associated with UEs, of the plurality of UEs, that are authorized to access services of the second private network site 108, where the service profiles are indicative of wireless communication services accessible to the UEs via the second private network site 108), etc. In some examples, the service management gateway 102 may store service profiles of the plurality of UEs on a service management data store of the service management gateway 102 (e.g., the service management gateway 102 may store copies of service profiles that are provisioned to private network sites of the plurality of private network sites).

In some examples, wireless services accessible via the first private network site 106 may differ across UEs authorized to access the first private network site 106. In an example, the first plurality of service profiles may comprise the first service profile associated with the first UE and the first private network site 106 and/or a service profile associated with a different UE and the first private network site 106, where the first service profile associated with the first UE is different than the service profile associated with the different UE. In an example, the first priority may be different than a priority indicated by the different service profile, the first QoS may be different than a QoS indicated by the different service profile, the first speed may be different than a speed indicated by the different service profile, and/or the first level of access may be different than a level of access indicated by the different service profile.

In some examples, the service management gateway 102 may encounter one or more provisioning failures and/or time-outs. For example, in an attempt to provision a service profile to a private network site of the plurality of private network sites, the service management gateway 102 may transmit the service profile to the private network site. The service management gateway 102 may determine that the attempt to provision the service profile failed. In an example, the determination that the attempt failed may be based upon reception of an indication that the service profile was not successfully received and/or stored by the private network site. Alternatively and/or additionally, the determination that the attempt failed may be based upon a time-out, such as where the service management gateway 102 does not receive, in a feedback window after the transmission of the service profile, a successful reception indication indicating successful reception of the service profile by the private network site. In some examples, in response to the provisioning attempt failure, the service management gateway 102 may perform one or more additional provisioning attempts, up to a threshold quantity of provisioning attempts, to provision the service profile to the private network site. If provisioning attempts amounting to the threshold quantity of provisioning attempts are performed and each of the provisioning attempts is a failed attempt, the service management gateway 102 may log the failure (e.g., the service management gateway 102 may store a failure log). In some examples, during a scheduled window, the service management gateway 102 may retry the failed provisioning (of the service profile to the private network site) one or more times up to a threshold quantity of times. If a quantity of times the failed provisioning is retried amounts to the threshold quantity of times, and the service profile is still not provisioned to the private network site (e.g., the service profile is not successfully transmitted to the private network site and/or stored on a profile data store of the private network site), the service management gateway 102 may archive the failure log.

In some examples, different UEs of the plurality of UEs may be provided with different authorization levels. In some examples, one or more first UEs of the plurality of UEs are authorized to access and/or be provided with wireless communication services of merely a single private network site of the plurality of private network sites. For example, merely a single service profile may be determined for a UE of the one or more first UEs, where the single service profile may be indicative of services accessible to the UE via a single private network site (e.g., a home private network site of the UE), and/or where the single service profile may be provisioned to the home private network site of the UE. In some examples, one or more second UEs of the plurality of UEs are authorized to access and/or be provided with wireless communication services of some private network sites of the plurality of private network sites. For example, service profiles may be determined for a UE of the one or more second UEs, wherein the service profiles may be indicative of services accessible to the UE via a subset of private network sites of the plurality of private network sites (e.g., each service profile of the service profiles may be indicative of services accessible to the UE via a private network site of the subset of private network sites), and/or wherein the service profiles may be provisioned to the subset of private network sites of the plurality of private network sites, respectively. In some examples, one or more third UEs of the plurality of UEs are authorized to access and/or be provided with wireless communication services of all private network sites of the plurality of private network sites. For example, service profiles may be determined for a UE of the one or more third UEs, wherein the service profiles may be indicative of services accessible to the UE via all private network sites of the plurality of private network sites (e.g., each service profile of the service profiles may be indicative of services accessible to the UE via a private network site of the plurality of private network sites), and/or wherein the service profiles may be provisioned to all private network sites of the plurality of private network sites, respectively.

In an example, the one or more first UEs may comprise a UE for which wireless communication services of the private network 104 is restricted to a single facility of the entity. A home private network site of the UE provides wireless coverage to the single facility (e.g., at least some of the single facility is covered by a coverage area of the home private network site of the UE). The UE may comprise a robot, lab equipment, a sensor, an IOT device, a camera, etc. that is used in a lab of the single facility (e.g., an engineering department building of a university corresponding to the entity).

In an example, the one or more second UEs may comprise a UE for which wireless communication services of the private network 104 is restricted to some facilities of the entity. Private network sites (of the plurality of private network sites) that the UE is authorized to access may provide wireless coverage to the facilities that the UE is authorized to access, respectively. The facilities may comprise a hospital and/or a medical department, where the UE is assigned to a medical doctor that is authorized to enter the hospital and/or the medical department for which wireless coverage is provided by the private network sites that the UE is authorized to access.

In an example, the one or more third UEs may comprise a UE that can access wireless communication services of the private network 104 via all facilities, of the entity, for which wireless coverage is provided by the plurality of private network sites. For example, the UE may be assigned to a dean of a university (corresponding to the entity) that is authorized to enter all the facilities of the university.

At 206, the service management gateway 102 may transmit the first service profile (of the first plurality of service profiles, for example) to the first private network site 106. In some examples, the first private network site 106 may store the first service profile (and/or the first plurality of service profiles) on a first profile data store of the first private network site 106, such as a first backend database of the first private network site 106. The first private network site 106 may use the first service profile to establish a wireless communication session with the first UE and/or to communicate with the first UE. For example, a type of communication session that the first private network site 106 establishes with the first UE may be based upon the first service profile associated with the first UE. Alternatively and/or additionally, one or more wireless communication services that the first private network site 106 provides to the first UE may be based upon the first service profile. In some examples, the first private network site 106 may establish a wireless communication session with the first UE when the first UE is in the first coverage area associated with the first private network site 106. For example, the first private network site 106 may establish the wireless communication session with the first UE in response to detecting the first UE. In some examples, in response to detecting the first UE, the first private network site 106 may analyze service profiles (e.g., the first plurality of service profiles) stored on the first profile data store to identify and/or retrieve the first service profile associated with the first UE. In an example, detecting the first UE may comprise receiving one or more messages from the first UE (when the first UE is within the first coverage area, for example). The one or more messages may comprise an indication of the UE identifier associated with the first UE. In response to detecting the first UE, the first service profile associated with the first UE may be identified and/or retrieved from among service profiles stored on the first profile data store based upon a determination that the UE identifier indicated by the one or more messages matches the UE identifier indicated by the first service profile. In response to identifying and/or retrieving the first service profile, the first private network site 106 may establish a wireless communication session with the first UE and/or provide one or more wireless communication services to the first UE. The wireless communication session and/or the one or more wireless communication services provided to the first UE may be based upon the first service profile. In some examples, a type of wireless communication session of the wireless communication session may be based upon the first service profile. In some examples, the one or more wireless communication services may be provided to the first UE according to at least one of the first priority, the first QoS, the first speed, the first level of access, etc. indicated by the first service profile.

At 208, the service management gateway 102 may transmit the second service profile (of the second plurality of service profiles, for example) to the second private network site 108. In some examples, the second private network site 108 may store the second service profile (and/or the second plurality of service profiles) on a second profile data store of the second private network site 108, such as a second backend database of the second private network site 108. The second private network site 108 may use the second service profile to establish a wireless communication session with the first UE and/or to communicate with the first UE. For example, a type of communication session that the second private network site 108 establishes with the first UE may be based upon the second service profile associated with the first UE. Alternatively and/or additionally, one or more wireless communication services that the second private network site 108 provides to the first UE may be based upon the second service profile. In some examples, the second private network site 108 may establish a wireless communication session with the first UE when the first UE is in the second coverage area associated with the second private network site 108. For example, the second private network site 108 may establish the wireless communication session with the first UE in response to detecting the first UE. In some examples, in response to detecting the first UE, the second private network site 108 may analyze service profiles (e.g., the second plurality of service profiles) stored on the second profile data store to identify and/or retrieve the second service profile associated with the first UE. In an example, detecting the first UE may comprise receiving one or more messages from the first UE (when the first UE is within the second coverage area, for example). The one or more messages may comprise an indication of the UE identifier associated with the first UE. In response to detecting the first UE, the second service profile associated with the first UE may be identified and/or retrieved from among service profiles stored on the second profile data store based upon a determination that the UE identifier indicated by the one or more messages matches the UE identifier indicated by the second service profile. In response to identifying and/or retrieving the second service profile, the second private network site 108 may establish a wireless communication session with the first UE and/or provide one or more wireless communication services to the first UE. The wireless communication session and/or the one or more wireless communication services provided to the first UE may be based upon the second service profile. In some examples, a type of wireless communication session of the wireless communication session may be based upon the second service profile. In some examples, the one or more wireless communication services may be provided to the first UE according to at least one of the second priority, the second QoS, the second speed, the second level of access, etc. indicated by the second service profile.

FIG. 3 illustrates an example of a system 301 comprising the first private network site 106, the service management gateway 102 and/or the first UE (shown with reference number 314). In some examples, the first private network site 106 may comprise a provisioning gateway 302 (e.g., a dynamic activation module), the first profile data store (shown with reference number 304), a first home subscriber server (HSS) 306, a first policy and charging rules function (PCRF) 308, a first Mobility Management Entity (MME) 312 and/or a first gateway 310 comprising a first serving gateway (SGW) and/or a first packet data network gateway (PGW). In some examples, the service management gateway 102 may be connected to and/or may communicate with the first provisioning gateway 302, the first HSS 306 and/or the first MME 312. The first provisioning gateway 302 may be connected to and/or may communicate with the first profile data store 304. In an example, the first provisioning gateway 302 may communicate with the first profile data store 304 via an application protocol (e.g., Lightweight Directory Access Protocol (LDAP)). The first profile data store 304 may be connected to and/or may communicate with the first HSS 306 and/or the first PCRF 308. In an example, the first profile data store 304 may communicate with the first HSS 306 via a messaging protocol (e.g., Simple Object Access Protocol (SOAP)). In an example, the first profile data store 304 may communicate with the first PCRF 308 via an application protocol (e.g., LDAP) and/or a messaging protocol (e.g., SOAP). The first HSS 306 may be connected to and/or may communicate with the first MME 312. In an example, the first HSS 306 may communicate with the first MME 312 via S6a interface and/or Diameter protocol. The first PCRF 308 may be connected to and/or may communicate with the first gateway 310. In an example, the first PCRF 308 may communicate with the first gateway 310 via Gx interface and/or Diameter protocol.

In some examples, the first provisioning gateway 302 is used for provisioning service profiles (e.g., the first plurality of service profiles) to the first profile data store 304. For example, the first provisioning gateway 302 may receive the first plurality of service profiles from the service management gateway 102 and/or may store the first plurality of service profiles on the first profile data store 304. In some examples, the first HSS 306 is configured to maintain and/or manage service profiles (e.g., the first plurality of service profiles) that are stored on the first profile data store 304. In some examples, the first PCRF 308 is configured to store and/or enforce one or more policies (e.g., network communication policies) associated with wireless communication of the first private network site 106 (e.g., wireless communication sessions of the first private network site 106 with UEs may be established and/or maintained according to the one or more policies and/or wireless communication services may be provided to the UEs according to the one or more policies). In some examples, the first MME 312 and/or the first gateway 310 are configured to establish and/or maintain wireless communication sessions with UEs (e.g., UEs within the first coverage area associated with the first private network site 106). In some examples, keys associated with authentication of UEs (e.g., UEs with which the first private network site 106 may establish wireless communication sessions) may be stored on the first HSS 306. A key stored on the first HSS 306 may be transmitted to the first MME 312, wherein the first MME 312 and/or the first gateway 310 may use the key to authenticate a UE. The first MME 312 and/or the first gateway 310 may establish and/or maintain a wireless communication session with the UE based upon authentication of the UE.

In an example, the first MME 312 and/or the first gateway 310 may detect the first UE 314 (e.g., when the first UE 314 is within the first coverage area associated with the first private network site 106). The first MME 312 may transmit a request, to the first HSS 306, for a service profile and/or one or more keys associated with the first UE 314. In an example, the first MME 312 may include the UE identifier associated with the first UE 314 in the request (e.g., the MME 312 may determine the UE identifier based upon one or more messages received by the first private network site 106 from the first UE 314). In response to the request from the first MME 312, the first HSS 306 may access the first profile data store 304 to identify the first service profile associated with the first UE 314 from among service profiles (e.g., the first plurality of service profiles) stored on the first profile data store 304. The first HSS 306 may provide the first MME 312 with the first service profile and/or one or more keys associated with the first UE 314. The first MME 312 may use the one or more keys to authenticate the first UE 314 (via an authentication process performed with the first UE 314, for example). The first MME 312 may establish a wireless communication session based upon the first service profile (e.g., the wireless communication session may be established in response to authenticating the first UE 314). Alternatively and/or additionally, the first MME 312 may provide one or more wireless communication services to the first UE 314 based upon the first service profile (and/or the first MME 312 may enforce the first service profile such that the one or more wireless communication services are provided to the first UE 314 according to at least one of the first priority, the first QoS, the first speed, the first level of access, etc. indicated by the first service profile). Alternatively and/or additionally, in the wireless communication session with the first UE 314, the first gateway 310 may enforce one or more policies provided by the first PCRF 308.

A private network site of the plurality of private network sites may detect UEs for which services profiles are unavailable, such as where a private network site detects a UE for which a service profile is not stored on a profile data store (e.g., a backend database) of the private network site.

In an example, the first private network site 106 may detect a fourth UE in the first coverage area of the first private network site. In some examples, in response to detecting the fourth UE, the first private network site 106 may analyze service profiles (e.g., the first plurality of service profiles) stored on the first profile data store 304 to determine whether or not the first profile data store 304 comprises a service profile associated with the fourth UE. Based upon a determination that the first profile data store 304 does not comprise a service profile for the fourth UE, the first private network site 106 may transmit a service query (e.g., a subscriber inquiry) to the service management gateway 102. In an example, detecting the fourth UE may comprise receiving one or more messages from the fourth UE (when the fourth UE is within the first coverage area, for example). The one or more messages may comprise an indication of a second UE identifier associated with the fourth UE (e.g., the second UE identifier may comprise information associated with the fourth UE, such as an IMSI number stored on a SIM card of the fourth UE and/or a key, associated with the IMSI number, stored on the SIM card of the fourth UE). In some examples, the determination that the first profile data store 304 does not comprise a service profile for the fourth UE may be based upon a determination that, among service profiles in the first profile data store 304, there is no service profile that is indicative of the second UE identifier associated with the fourth UE. In some examples, the determination that the first profile data store 304 does not comprise a service profile for the fourth UE may be performed by the first HSS 306 (e.g., the first HSS 306 may access the first profile data store 304 and/or determine that the first profile data store 304 does not comprise a service profile for the fourth UE). For example, the first HSS 306 may access the first profile data store 304 (and/or determine that the first profile data store 304 does not comprise a service profile for the fourth UE) in response to receiving a request for a service profile associated with the fourth UE from the first MME 312 (e.g., the MME 312 may transmit the request for a service profile to the first HSS 306 in response to detecting the fourth UE and/or communicating with the fourth UE). In some examples, the first HSS 306 may transmit the service query to the service management gateway 102 in response to the determination that the first profile data store 304 does not comprise a service profile for the fourth UE. The service query may be indicative of the second UE identifier associated with the fourth UE.

The service management gateway 102 may receive the service query from the first private network site 106 (e.g., from the first HSS 306). In some examples, in response to receiving the service query, the service management gateway 102 may analyze service profiles stored on the service management data store to determine whether or not the service management data store comprises a service profile that is associated with the fourth UE and/or the first private network site 106, such as a service profile of wireless communication services accessible to the fourth UE via the first private network site 106.

In a first example scenario, the service management data store may comprise a third service profile associated with the fourth UE and/or the first private network site 106. For example, the third service profile may be indicative of wireless communication services accessible to the fourth UE via the first private network site 106. The service management gateway 102 may identify the third service profile from among service profiles stored on the service management data store based upon the third service profile comprising an indication of the second UE identifier associated with the fourth UE and/or based upon the third service profile being indicative of the first private network site 106 (e.g., the third service profile may comprise a private network site identifier associated with the first private network site 106). In some examples, in response to identifying the third service profile, the service management gateway 102 may provision the third service profile to the first private network site 106 (e.g., the service management gateway 102 may initiate provisioning of the third service profile in the first private network site 106, wherein the initiated provisioning may be performed in a synchronous process). In some examples, in response to identifying the third service profile, the service management gateway 102 may transmit the third service profile to the first private network site 106. For example, the service management gateway 102 may transmit the third service profile to the first HSS 306 (from which the service query is received, for example).

In some examples, in response to receiving the third service profile from the service management gateway 102, the first private network site 106 may store the third service profile on the first profile data store 304. In an example, the first HSS 306 may store the third service profile on the first profile data store 304. Accordingly, using the techniques provided herein to provide the first private network site 106 with the third service profile of the fourth UE and/or store the third service profile on the first profile data store 304, the first private network site 106 and/or the first profile data store 304 may be corrected (e.g., healed) and/or updated to comprise the third service profile such that the first private network site 106 can recognize the fourth UE and/or correctly provide services accessible to the fourth UE.

In some examples, based upon the third service profile (received from the service management gateway 102), the first private network site 106 may establish a wireless communication session with the fourth UE (e.g., the first private network site 106 may use the third service profile to establish a wireless communication session with the fourth UE) and/or provide one or more wireless communication services to the fourth UE. For example, a type of communication session that the first private network site 106 establishes with the fourth UE may be based upon the third service profile associated with the fourth UE. Alternatively and/or additionally, one or more wireless communication services that the first private network site 106 provides to the fourth UE may be based upon the third service profile. In some examples, the one or more wireless communication services may be provided to the fourth UE according to at least one of a third priority, a third QoS, a third speed, a third level of access, etc. indicated by the third service profile. In an example, the third level of access may be indicative of one or more resources of the private network 104. Based upon the third service profile (e.g., the third level of access indicated by the third level of access), the fourth UE may be provided with access to the one or more resources and may not be provided with resources, of the private network 104, other than the one or more resources. In an example, the first HSS 306 may provide the first MME 312 with the third service profile, and/or the first MME 312 may establish the communication session, with the fourth UE, based upon the third service profile.

In a second example scenario, the service management gateway 102 may determine that the service management data store does not comprise a service profile associated with the fourth UE and the first private network site 106. In some examples, the determination that the service management data store does not comprise a service profile for the fourth UE and the first private network site 106 may be based upon a determination that, among service profiles in the service management data store, there is no service profile that is indicative of wireless communication resources accessible to the fourth UE via the first private network site 106 (e.g., among service profiles in the service management data store, there is no service profile that is indicative of both the second UE identifier associated with the fourth UE and the private network site identifier associated with the first private network site 106).

In a first example of the second example scenario, in response to the determination that the service management data store does not comprise a service profile for the fourth UE and the first private network site 106, the service management gateway 102 may provision a default service profile to the first private network site 106 (e.g., the service management gateway 102 may initiate provisioning of the default service profile in the first private network site 106, wherein the provisioning may be performed in a synchronous process). For example, the service management gateway 102 may transmit the default service profile to the first private network site 106. For example, the service management gateway 102 may transmit the default service profile to the first HSS 306 (from which the service query is received, for example). In some examples, based upon the default service profile, the first private network site 106 may establish a wireless communication session with the fourth UE and/or provide one or more wireless communication services to the fourth UE. In some examples, the one or more wireless communication services may be provided to the fourth UE according to at least one of a default priority, a default QoS, a default speed, a default level of access, etc. indicated by the default service profile. In an example, the first HSS 306 may provide the first MME 312 with the third service profile, and/or the first MME 312 may establish the communication session, with the fourth UE, based upon the third service profile.

As an alternative and/or in addition to transmitting the default service profile, in a second example of the second example scenario, in response to the determination that the service management data store does not comprise a service profile for the fourth UE and the first private network site 106, the service management gateway 102 may transmit, to the first private network site 106, an indication that a service profile associated with the fourth UE and the first private network site 106 is not available. In some examples, based upon the indication, the first private network site 106 may not establish a wireless communication session with the fourth UE and/or may not provide one or more wireless communication services to the fourth UE. Alternatively and/or additionally, based upon the indication, the first private network site 106 may block the fourth UE from one or more wireless communication services (e.g., may not allow the fourth UE to access one or more resources, such as resources of the first private network site 106 and/or the private network 104). Alternatively and/or additionally, based upon the indication, the first private network site 106 may establish a default wireless communication session and/or provide one or more default wireless communication services to the fourth UE (e.g., the default wireless communication session and/or the one or more default wireless communication services may be used for UEs for which service profiles associated with the first private network site 106 are not available).

In a third example of the second example scenario, in response to the determination that the service management data store does not comprise a service profile for the fourth UE and the first private network site 106, the service management gateway 102 may not transmit a response to the service query. In some examples, based upon not receiving a response to the service query (e.g., not receiving a response to the service query within a response window), the first private network site 106 may not establish a wireless communication session with the fourth UE and/or may not provide one or more wireless communication services to the fourth UE. Alternatively and/or additionally, based upon not receiving a response to the service query (e.g., not receiving a response to the service query within a response window), the first private network site 106 may block the fourth UE from one or more wireless communication services (e.g., may not allow the fourth UE to access one or more resources, such as resources of the first private network site 106 and/or the private network 104). Alternatively and/or additionally, based upon not receiving a response to the service query (e.g., not receiving a response to the service query within a response window), the first private network site 106 may establish a default wireless communication session and/or provide one or more default wireless communication services to the fourth UE (e.g., the default wireless communication session and/or the one or more default wireless communication services may be used for UEs for which service profiles associated with the first private network site 106 are not available).

In a third example scenario, the service management gateway 102 may determine that the fourth UE is a blacklisted UE. For example, the service management gateway 102 may determine that the fourth UE is a blacklisted UE based upon a determination that the second UE identifier associated with the fourth UE is included in a list of blacklisted UE identifiers. In some examples, the determination that the fourth UE is a blacklisted UE may be due, at least in part, to at least one of the fourth UE being associated with malicious activity, the fourth UE being hacked by a malicious entity, the fourth UE being associated with fraud, the fourth UE having been cloned (such as where a key of a SIM card of the fourth UE is copied and used by a separate UE), etc. In an example, in response to the determination that the fourth UE is a blacklisted UE, the service management gateway 102 may transmit, to the first private network site 106, an indication that the fourth UE is a blacklisted UE. Based upon the indication that the fourth UE is a blacklisted UE, the first private network site 106 may (i) not establish a wireless communication session with the fourth UE, (ii) terminate a wireless communication session with the fourth UE, (iii) not provide one or more wireless communication services to the fourth UE, and/or (iv) block access of the fourth UE to one or more wireless communication services (e.g., resources of the first private network site 106 and/or the private network 104).

Alternatively and/or additionally, in response to the determination that the fourth UE is a blacklisted UE, the service management gateway 102 may transmit, to the first private network site 106, an instruction to not establish and/or terminate a wireless communication session of the first private network site 106 with the fourth UE. Alternatively and/or additionally, in response to the determination that the fourth UE is a blacklisted UE, the service management gateway 102 may not transmit a response to the service query. In some examples, based upon not receiving a response to the service query (e.g., not receiving a response to the service query within a response window), the first private network site 106 may (i) not establish a wireless communication session with the fourth UE, (ii) terminate a wireless communication session with the fourth UE, (iii) not provide one or more wireless communication services to the fourth UE, and/or (iv) block access of the fourth UE to one or more wireless communication services (e.g., resources of the first private network site 106 and/or the private network 104).

In some examples, after receiving the service query, associated with the fourth UE, from the first private network site 106, the service management gateway 102 may perform a first malicious activity detection process associated with the fourth UE. The first malicious activity detection process may be performed to determine whether or not the fourth UE is legitimately accessing the first private network site 106. In some examples, the first malicious activity detection process may be performed in a scenario (e.g., the first example scenario and/or the second example scenario) in which a service profile (e.g., a valid service profile, such as the third service profile and/or the default service profile) associated with the fourth UE is transmitted to the first private network site 106. In some examples, the first malicious activity detection process may comprise determining whether or not there is an ongoing wireless communication session of the fourth UE with a fourth private network site (of the plurality of private network sites). In some examples, the fourth private network site may be checked for an ongoing session with the fourth UE based upon a determination that (i) the fourth private network site is designated a home private network site of the fourth UE, and/or (ii) prior to the receiving the service query, the fourth private network site (previously) established a wireless communication session with the fourth UE. The service management gateway 102 may determine whether or not there is an ongoing wireless communication session of the fourth UE with the fourth private network site by transmitting a request, to an MME of the fourth private network site, for a session status associated with the fourth UE. In response to the request, the MME of the fourth private network site may transmit, to the service management gateway 102, an indication of whether or not there is an ongoing wireless communication session with the fourth UE. In an example, the MME is queried (e.g., using the second UE identifier of the fourth UE) to determine whether or not there is an ongoing wireless communication session of the fourth UE with the fourth private network site (e.g., it may be determined that there is an ongoing wireless communication session of the fourth UE with the fourth private network site based upon a determination that the second UE identifier associated with the fourth UE is active on the MME). Alternatively and/or additionally, in an example in which the fourth private network site comprises a plurality of MMEs, at least some MMEs of the plurality of MMEs may be queried (e.g., using the second UE identifier of the fourth UE) to determine whether or not there is an ongoing wireless communication session of the fourth UE with the fourth private network site. Alternatively and/or additionally, in an example in which the plurality of MMEs comprises MME pairs, for each MME pair of the MME pairs (e.g., all MME pairs of the plurality of MMEs), at least one MME may be queried (e.g., using the second UE identifier of the fourth UE) to determine whether or not there is an ongoing wireless communication session of the fourth UE with the fourth private network site (e.g., one MME of a MME pair may be queried to determine whether or not the second UE identifier is active on either MME of the MME pair).

In some examples, it may be determined that the fourth UE is legitimately accessing the first private network site 106 and/or that the fourth UE is not associated with malicious activity based upon a determination that there is not an ongoing wireless communication session of the fourth UE with the fourth private network site.

In some examples, in response to a determination that there is an ongoing wireless communication session of the fourth UE with the fourth private network site, the service management gateway 102 may transmit an instruction, to the fourth private network site, to terminate the ongoing wireless communication session and/or to disconnect from the fourth UE. For example, the instruction may be transmitted to an MME of the fourth private network site. In an example in which the ongoing wireless communication session is a stale wireless communication session, instructing the fourth private network site to terminate the ongoing wireless communication session and/or to disconnect from the fourth UE may clear the stale wireless communication session. After transmitting the instruction, the service management gateway 102 may determine whether or not a new wireless communication session of the fourth private network site with the fourth UE is established. A first time at which the service management gateway 102 performs the determination (of whether or not a new wireless communication session of the fourth private network site with the fourth UE is established) may be after a duration of time has elapsed from a second time corresponding to a time at which the instruction is transmitted, a time at which the ongoing wireless communication session is terminated, and/or a time at which the fourth private network site is disconnected from the fourth UE. For example, the service management gateway 102 may perform the determination upon expiration of a timer (e.g., a configurable timer) set to the duration of time (e.g., the timer may start when the instruction is transmitted, the ongoing wireless communication session is terminated, and/or the fourth private network site is disconnected from the fourth UE). In some examples, the service management gateway 102 may perform the determination using one or more of the techniques provided herein with respect to detects the ongoing wireless communication session of the fourth UE with the fourth private network site. In some examples, based upon the determination, whether or not the ongoing wireless communication (that was terminated in response to the instruction to the fourth private network site, for example) was a stale wireless communication session may be determined. A stale wireless communication session may correspond to a session that has been inactive for over a threshold duration of time.

It may be determined that the ongoing wireless communication session was a stale wireless communication session based upon a determination that a new wireless communication session is not established after the ongoing wireless communication session was terminated. In some examples, it may be determined that the fourth UE is legitimately accessing the first private network site 106 and/or that the fourth UE is not associated with malicious activity based upon a determination that the ongoing wireless communication session was a stale wireless communication session.

It may be determined that the ongoing wireless communication session was not a stale wireless communication session based upon a determination that a new wireless communication session is established after the ongoing wireless communication session was terminated. Based upon detecting the new wireless communication session and/or the determination that the ongoing wireless communication session was not a stale wireless communication session, it may be determined that the fourth UE is associated with malicious activity (e.g., fraud). For example, it may be determined that a malicious actor is attempting to access the first private network site 106 or the fourth private network site using a cloned UE (with a duplicate SIM, for example) with one or more credentials (e.g., at least one of a key, a UE identifier, a IMSI number, etc.) of the fourth UE. In some examples, in response to detecting the new wireless communication session and/or determining that the ongoing wireless communication session was not a stale wireless communication session, the service management gateway 102 may blacklist the second UE identifier associated with the fourth UE (e.g., add the second UE identifier to the list of blacklisted UE identifiers). For example, the second UE identifier may be blacklisted for a defined duration of time (to prevent a non-stop from being executed in the first malicious activity detection process and/or to prevent the first malicious activity detection process from being executed infinitely, for example). Alternatively and/or additionally, in response to detecting the new wireless communication session and/or determining that the ongoing wireless communication session was not a stale wireless communication session, the service management gateway 102 may instruct the first private network site 106 and/or the fourth private network site to not establish and/or to terminate a wireless communication session with the fourth UE. In an example, the service management gateway 102 may transmit a NACK (Negative Acknowledgment), such as in an asynchronous process, to the first private network site 106 and/or the fourth private network site, wherein the NACK may indicate, first private network site 106 and/or the fourth private network site, not to establish and/or to terminate a wireless communication session with the fourth UE. Accordingly, malicious activity may be detected and/or prevented using the techniques provided herein for performing the first malicious activity detection process.

In some examples, at least some of the first malicious activity detection process may be performed concurrently with or after transmitting a service profile (e.g., a valid service profile, such as the third service profile and/or the default service profile) associated with the fourth UE to the first private network site 106 and/or establishment, by the first private network site 106, of a wireless communication session with the fourth UE (based upon the service profile, for example). For example, the at least some of the first malicious activity detection process may comprise the determination of whether or not there is the ongoing wireless communication session of the fourth UE with the fourth private network site, the determination of whether or not there was the new wireless communication session is established after the ongoing wireless communication session was terminated, etc.), and/or instructing the first private network site 106 and/or the fourth private network site to not establish and/or to terminate a wireless communication session with the fourth UE.

In some examples, malicious activity detection processes may be performed for UE identifiers of UEs that are detected by private network sites of the plurality of private network sites. For example, the service management gateway 102 may perform the malicious activity detection processes for UE identifiers that are indicated by service queries from private network sites of the plurality of private network sites. For example, the malicious activity detection processes may be performed to check for duplicate live sessions (e.g., where there are multiple concurrent wireless communication sessions of a UE with multiple private network sites of the plurality of private network sites), inconsistencies (e.g., where a UE is detected by a private network site while there are one or more ongoing wireless communication sessions with one or more other private network sites), stale wireless communication sessions (e.g., wireless communication sessions that have been inactive for over a threshold duration of time), and/or indications of malicious activity (e.g., fraud). The malicious activity detection processes may be performed using one or more of the techniques provided herein with respect to the first malicious activity detection process. In some examples, the service management gateway 102 may perform the malicious activity detection processes randomly, such as where a UE identifier is randomly selected to undergo a malicious activity detection process (in response to receiving a service query indicative of the UE identifier, for example).

Figure 4:
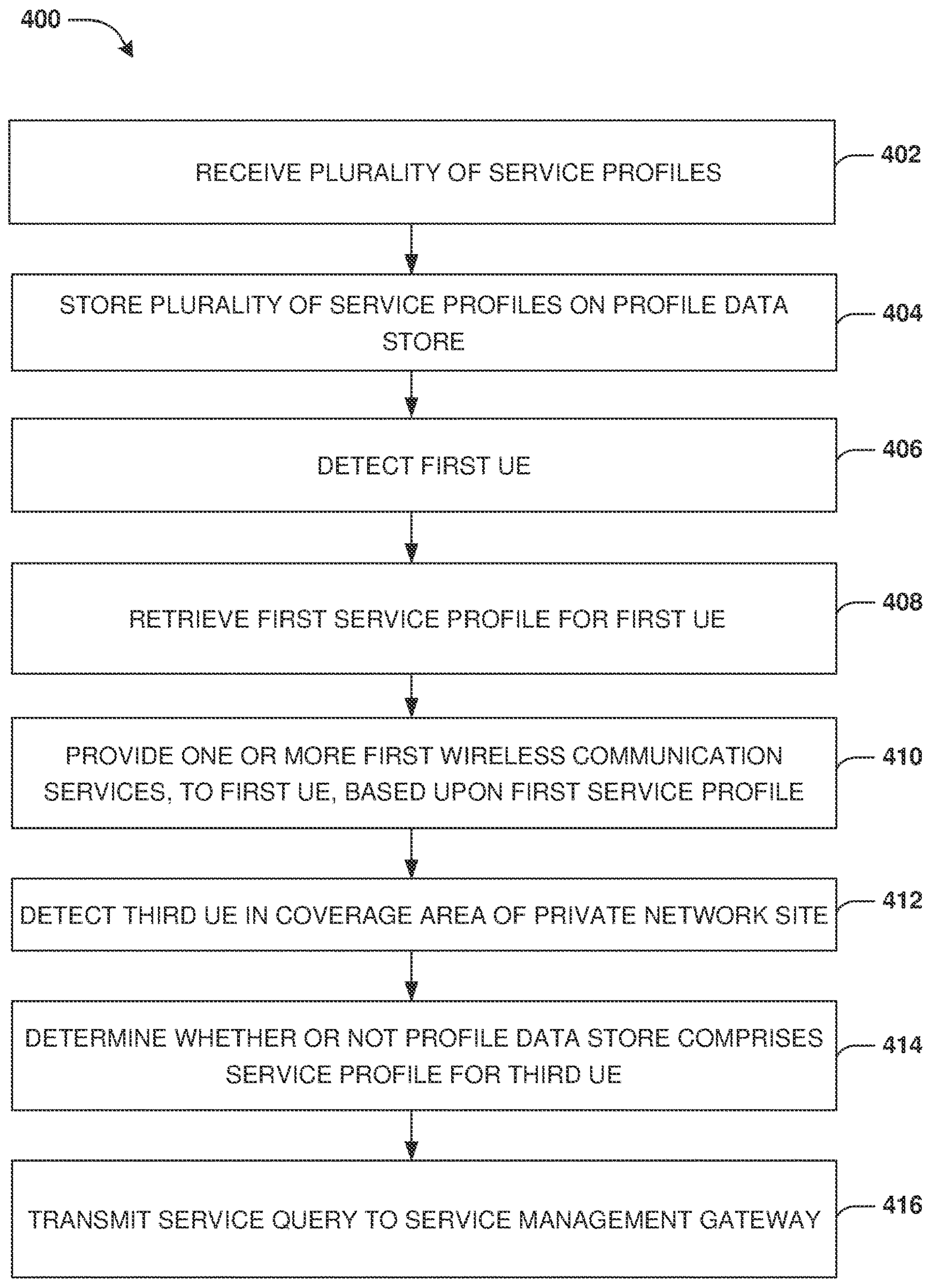
FIG. 4 is a flow chart illustrating an example method for providing wireless communication services via a private network site in accordance with an embodiment.

An embodiment of providing wireless communication services via the first private network site 106 is illustrated by an example method 400 of FIG. 4, and is further described in conjunction with FIGS. 1 and 3. At 402, the first private network site 106 may receive the first plurality of service profiles. The first plurality of service profiles may be received from the service management gateway 102. The first plurality of service profiles may be associated with UEs that are authorized to access services of the first private network site 106 (e.g., service profiles of the first plurality of service profiles are indicative of wireless communication services accessible to the UEs via the first private network site 106). The first plurality of service profiles may be received from the service management gateway 102. At 404, the first private network site 106 may store the first plurality of service profiles on the first profile data store 304 of the first private network site 106. In an example, the first plurality of service profiles may be received by the first provisioning gateway 302 of the first private network site 106, and/or the first provisioning gateway 302 may store the first plurality of service profiles on the first profile data store 304. At 406, the first private network site 106 detects the first UE 314 (e.g., the first UE 314 is detected in the first coverage area of the first private network site 106). In an example, detecting the first UE 314 may comprise receiving one or more messages from the first UE 314 when the first UE 314 is in the first coverage area of the first private network site 106. At 408, in response to detecting the first UE 314, the first private network site 106 retrieves the first service profile (of the first plurality of service profiles stored on the first profile data store 304) from the first profile data store 304. In some examples, the first service profile may be retrieved by the first HSS 306, such as where the first HSS 306 accesses the first profile data store 304 to identify the first service profile associated with the first UE 314 from among service profiles (e.g., the first plurality of service profiles) stored on the first profile data store 304. At 410, the first private network site 106 provides one or more first wireless communication services, to the first UE 314, based upon the first service profile. For example, the one or more first wireless communication services may be provided to the first UE 314 according to at least one of the first priority, the first QoS, the first speed, the first level of access, etc. indicated by the first service profile. At 412, the first private network site 106 detects the fourth UE (e.g., the fourth UE is detected in the first coverage area of the first private network site 106). In an example, detecting the fourth UE may comprise receiving one or more messages from the fourth UE when the fourth UE is in the first coverage area of the first private network site 106. At 414, in response to detecting the fourth UE, the first private network site 106 determines whether or not the first profile data store 304 comprises a service profile for the fourth UE. At 416, based upon a determination that the first profile data store 304 does not comprise a service profile for the fourth UE, the first private network site 106 transmits a service query to the service management gateway 102. In an example, the service query is indicative of a UE identifier of the fourth UE, such as a UE identifier indicated by a message of the one or more messages received from the fourth UE.

In some examples (e.g., in the first example scenario and/or the second example scenario), the first private network site 106 receives, from the service management gateway 102, a service profile of wireless communication services accessible to the fourth UE via the first private network site 106. In an example, the service profile is transmitted, by the service management gateway 102, in response to the service query. The service profile may comprise the third service profile in the first example scenario in which the service management data store of the service management gateway 102 comprises the third service profile associated with the fourth UE and the first private network site 106. Alternatively and/or additionally, the service profile may comprise the default service profile in the second example scenario in which the service management data store does not comprise a service profile associated with the fourth UE and the first private network site 106. In some examples, the first private network site 106 may establish a wireless communication session with the fourth UE and/or provide the first private network site 106 with one or more wireless communication services based upon the service profile received form the service management gateway 102 (e.g., the one or more wireless communication services may be provided at least one of a priority, a QoS, a speed, a level of access, etc. indicated by the service profile).

In some examples, the first private network site 106 may determine that a service profile associated with the fourth UE and the first private network site 106 is not available and/or that the fourth UE is blacklisted based upon (i) an indication, from the service management gateway 102, that a service profile associated with the fourth UE and the first private network site 106 is not available, (ii) an indication, from the service management gateway 102, that the fourth UE is blacklisted, and/or (iii) not receiving a response, to the service query, within a response window after transmitting the service query (e.g., not having received a response to the service query within the response window may indicate that a service profile associated with the fourth UE and the first private network site 106 is not available and/or that the fourth UE is blacklisted). In some examples, based upon the determination that a service profile associated with the fourth UE and the first private network site 106 is not available and/or that the fourth UE is blacklisted, the first private network site 106 may (i) not establish a wireless communication session with the fourth UE, (ii) terminate an existing wireless communication session with the fourth UE, and/or (iii) block access of the fourth UE to one or more wireless communication services.

Figure 5:
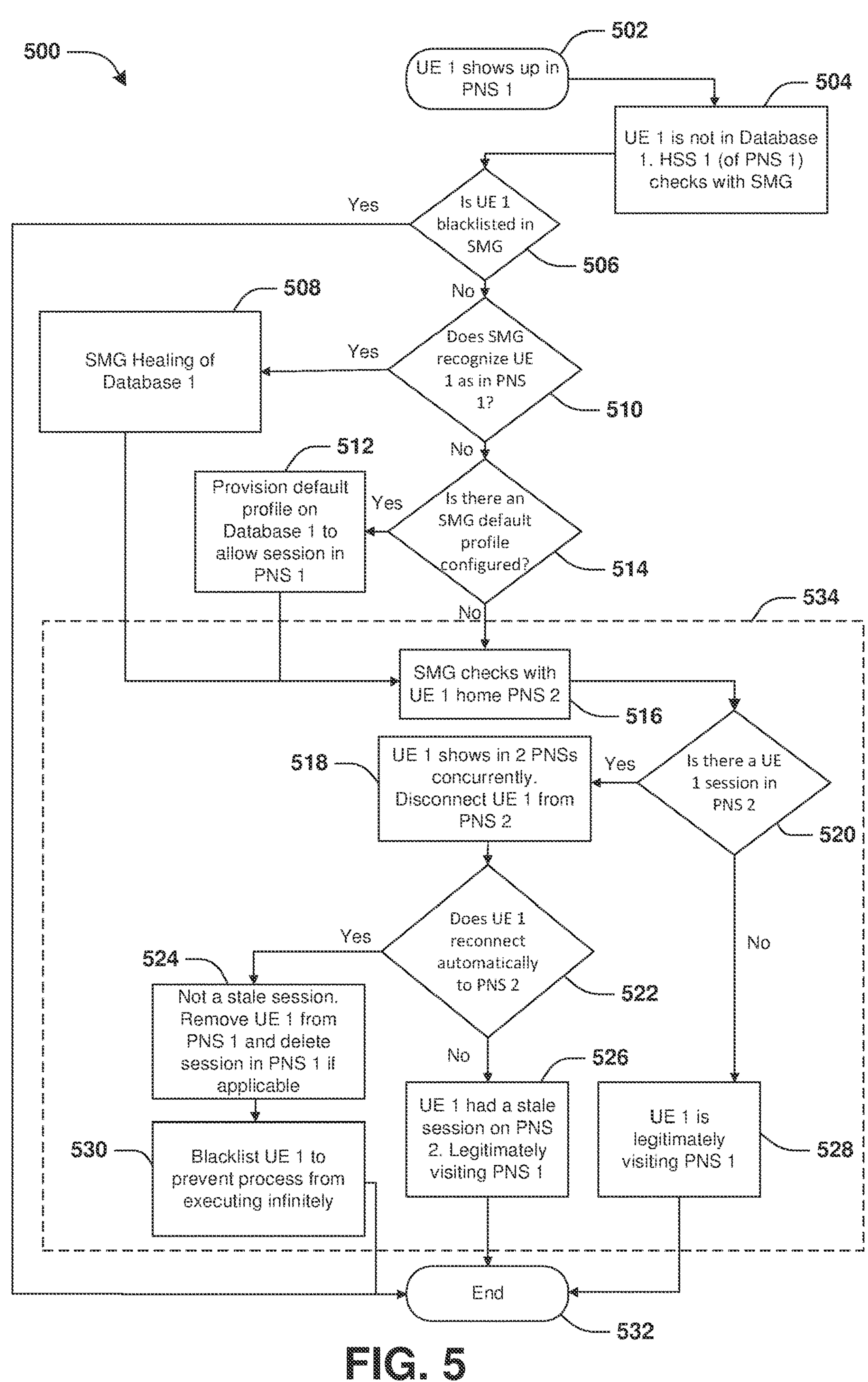
FIG. 5 is a flow chart illustrating an example method for performing a UE service process in accordance with an embodiment.

An embodiment of performing a UE service process is illustrated by an example method 500 of FIG. 5, and is further described in conjunction with FIGS. 1 and 3. At 502, the fourth UE ("UE 1" in FIG. 5) may be detected by the first private network site 106 ("Private network site (PNS) 1" in FIG. 5), such as when the fourth UE is within the first coverage area associated with the first private network site 106. At 504, the first private network site 106 (e.g., the first HSS 306) may determine that the fourth UE is not defined by the first profile data store 304 ("Database 1" in FIG. 5) (e.g., the first private network site 106 may determine that the first profile data store 304 does not comprise a service profile associated with the fourth UE) and/or the first private network site 106 (e.g., the first HSS 306) may transmit a service query, to the security management gateway 102 ("SMG" in FIG. 5), indicative of the second UE identifier associated with the fourth UE. At 506, the security management gateway 506 may determine whether or not the fourth UE is a blacklisted UE.

In response to a determination that the fourth UE is a blacklisted UE, the security management gateway 102 may end 532 the UE service process and/or transmit an indication of the fourth UE being a blacklisted UE to the first private network site 106. In some examples, based upon not receiving a response to the service query (e.g., not receiving a response to the service query within a response window) and/or receiving the indication of the fourth UE being a blacklisted UE, the first private network site 106 may (i) not establish a wireless communication session with the fourth UE, (ii) terminate a wireless communication session with the fourth UE, (iii) not provide one or more wireless communication services to the fourth UE, and/or (iv) block access of the fourth UE to one or more wireless communication services (e.g., resources of the first private network site 106 and/or the private network 104).

In response to a determination that the fourth UE is not a blacklisted UE, the security management gateway 102 may determine, at 510, whether or not the service management data store of the security management gateway 102 comprises a service profile associated with the fourth UE and the first private network site 106.

In some examples, in response to a determination that the service management data store comprises a service profile (e.g., the third service profile) associated with the fourth UE and the first private network site 102, the security management gateway 102 may transmit, at 508, the third service profile to the first private network site 106 to correct and/or heal the first profile data store 304 of the first private network site 106. For example, the security management gateway 102 may transmit the third service profile to the first HSS 306 and/or the first HSS 306 may store the third service profile on the first profile data store 304 (e.g., the first HSS 306 may correct the first profile data store 304 such that the first profile data store 304 comprises the third service profile that was previously missing on the first profile data store 304).

In some examples, in response to a determination that the service management data store does not comprise a service profile associated with the fourth UE and the first private network site 102, the security management gateway 102 may determine, at 514, whether or not the default service profile (that can be used by the first private network site 106 for providing wireless communication services to the fourth UE, for example) is configured.

In some examples, in response to a determination that the default service profile (that can be used by the first private network site 106 for providing wireless communication services to the fourth UE, for example) is configured, the security management gateway 102 may transmit, at 512, the default service profile to the first private network site 106 to provision the default service profile on the first profile data store 304 and/or allow a wireless communication session of the first private network site 106 with the fourth UE to be established and/or maintained using the default service profile.

In some examples, the service management gateway 102 may perform the first malicious activity detection process (shown with reference number 534) associated with the fourth UE in response to transmitting (at 508) the third service profile to the first private network site 106, transmitting (at 512) the default service profile to the first private network site 106, or determining (at 514) that the default service profile (that can be used by the first private network site 106 for providing wireless communication services to the fourth UE, for example) is not configured. The first malicious activity detection process 534 may comprise acts 516, 518, 520, 522, 524, 526, 528 and/or 530. Embodiments are contemplated in which, rather than performing the first malicious activity detection process 534 in response to transmitting (at 508) the third service profile to the first private network site 106, the security management gateway 102 may end 532 the UE service process in response to transmitting (at 508) the third service profile to the first private network site 106.

In some examples, the service management gateway 102 may check, at 516, the fourth private network site ("PNS 2" in FIG. 5) for an ongoing session with the fourth UE (e.g., the fourth private network site may be designated a home private network site of the fourth UE). For example, the service management gateway 102 may communicate with the fourth private network site to determine, at 520, whether or not there is an ongoing session of the fourth UE with the fourth private network site. In response to a determination that there is not an ongoing session of the fourth UE with the fourth private network site, the service management gateway 102 may determine, at 528, that the fourth UE is legitimately visiting the first private network site 106 and/or the service management gateway 102 may end 532 the UE service process. In response to a determination that there is an ongoing session of the fourth UE with the fourth private network site, the service management gateway 102 may, at 518, determine that the fourth UE is detected on two private network sites concurrently (e.g., the first private network site 106 and the fourth private network site) and/or instruct the fourth private network site to disconnect from the fourth UE. In some examples, at 522, the service management gateway 102 may determine whether or not the fourth reconnects to the fourth private network site after a duration of time (e.g., upon expiration of the timer). For example, at 522, the service management gateway 102 may determine whether or not a new wireless communication session of the fourth private network site with the fourth UE is established.

In some examples, in response to a determination that the fourth UE does not reconnect to the fourth private network site (e.g., in response to a determination that a new wireless communication session of the fourth private network site with the fourth UE is not established after the ongoing wireless communication session was terminated), the service management gateway 102 may determine, at 526, that the ongoing wireless communication session was a stale wireless communication session and/or that the fourth UE is legitimately visiting the first private network site 106. Alternatively and/or additionally, the service management gateway 102 may end 532 the UE service process.

In some examples, in response to a determination that the fourth UE does reconnect to the fourth private network site (e.g., in response to a determination that a new wireless communication session of the fourth private network site with the fourth UE is established after the ongoing wireless communication session was terminated), at 524, the service management gateway 102 may (i) determine that the ongoing wireless communication session was not a stale wireless communication session, (ii) remove a service profile of the fourth UE (e.g., the third service profile or the default service profile) from the first profile data store 304 of the first private network site 106 (e.g., the service management gateway 102 may instruct the first private network site 106 to remove the service profile of the fourth UE from the first profile data store 304), and/or (iii) delete an established wireless communication session of the first private network site 106 with the fourth UE (e.g., the service management gateway 102 may instruct the first private network site 106 to terminate the established wireless communication session with the fourth UE). Alternatively and/or additionally, at 530, the service management gateway 102 may blacklist the fourth UE for a defined duration of time (to prevent the first malicious activity detection process 534 and/or the UE service process from being executed infinitely, for example) and/or the service management gateway 102 may end 532 the UE service process.

Figure 6:
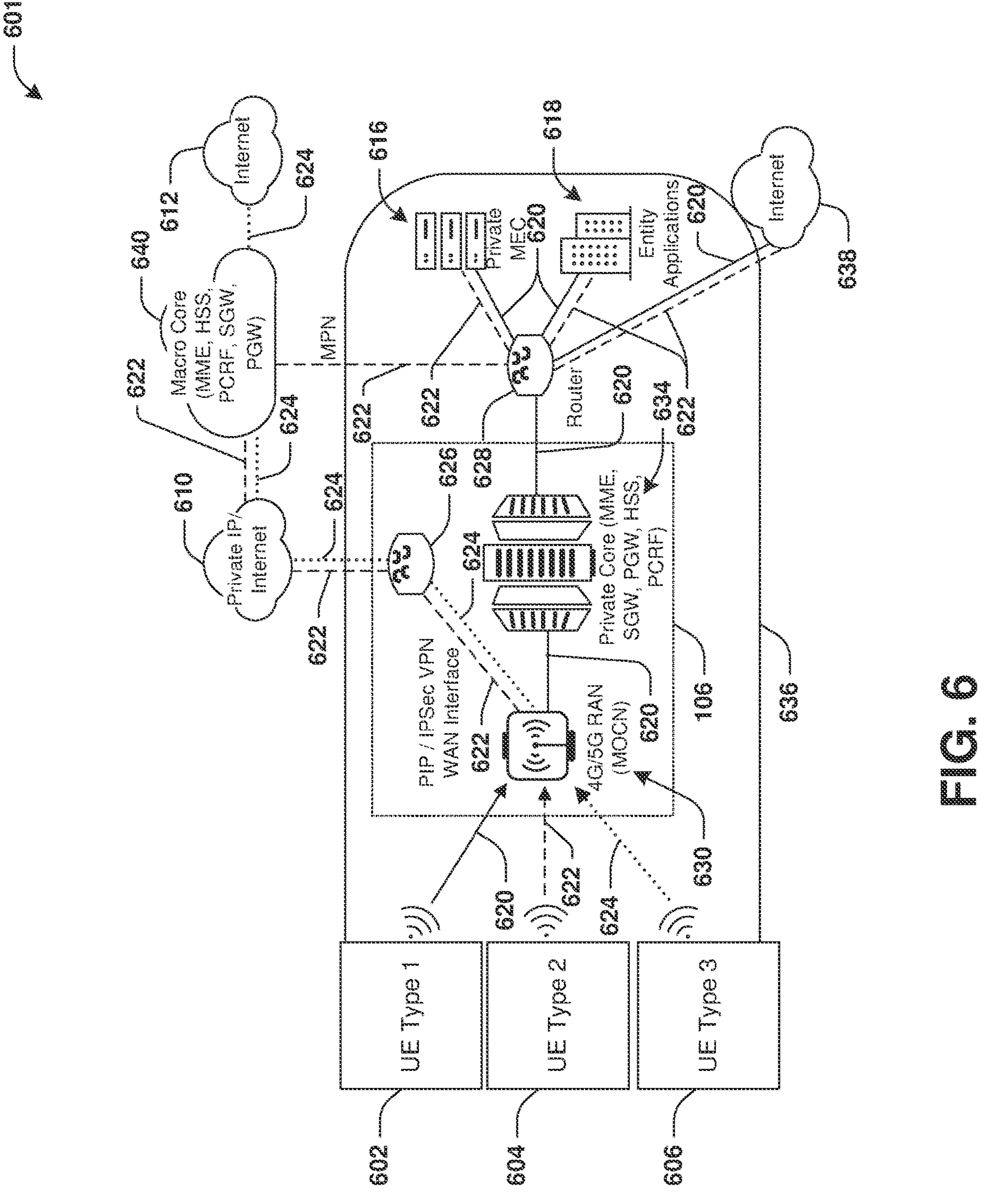
FIG. 6 is a diagram illustrating an example system comprising a private network site in accordance with an embodiment.

FIG. 6 illustrates an example of a system 601 comprising the first private network site 106. The first private network site 106 may comprise at least one of an On-Site Private Network apparatus, an On-Site 5G apparatus, an On-Site LTE apparatus, a network in a box (NIB), a network on wheels, a base station (e.g., a portable base station), a standalone private network, a non-standalone private network, etc. In some examples, compared to public networks of the wireless service provider, such as networks that are accessible to subscribers of a wireless plan (e.g., a monthly plan), the first private network site 106 may be scaled down to be deployable at a facility of the entity, where the first private network site 106 and/or other private network sites (of the plurality of private network sites) of the private network 104 may be dedicated for providing network resources to UEs associated with the entity (e.g., the UEs may comprise UEs of at least one of people, machines, vehicles, sensors, etc.). In some examples, at least some technology used to implement a public network of the wireless service provider (e.g., a Next Generation Node B (gNB), an evolved Node B (eNB), etc.) may be implemented in the first private network site 106, where the first coverage area (shown with reference number 636) may be smaller than a coverage area of the public network. For example, the first coverage area 636 may be within the (larger) coverage area of the public network. In some examples, even if coverage provided by the public network is relatively slow (and/or even if there is no public network that provides wireless coverage to the first coverage area 636), UEs that are within the first coverage area 636 and are associated with the entity (e.g., UEs authorized to access wireless communication services of the first private network site 106 and/or the private network 104) may be provided with wireless communication services provided by the first private network site 106 (e.g., the wireless communication services may have at least at least one of higher speed, higher capacity, lower latency, etc. than the relatively slow coverage provided by the public network to unauthorized UEs). In some examples, the first private network site 106 may provide at least one of 5G wireless communication services, 4G LTE wireless communication services, millimeter-wave wireless communication services (e.g., 5G millimeter-wave), etc. to authorized UEs associated with the entity. In some examples, cellular traffic (e.g., all cellular traffic) of the first private network site 106 with UEs may stay on-premises (e.g., within the first private network site 106 and/or the first coverage area 636), while the first private network site 106 may provide authorized remote user access to at least one of one or more Multi-Access/Mobile Edge Computing (MEC) devices 616 of the private network 104, one or more entity applications 618 of the private network 104, and/or a wide area network (WAN) 638, such as the Internet.

In some examples, the first private network site 106 may interact with one or more UEs 602 of a first type "UE Type 1", one or more UEs 604 of a second type "UE Type 2" and/or one or more UEs 606 of the third type "UE Type 3".

The one or more UEs 602 of the first type "UE Type 1" may correspond to entity-exclusive UEs that (i) have exclusive connectivity with one or more private network sites of the private network 104, (ii) have custom SIMs related to the private network 104, (iii) are tethered (e.g., attached) to one or more private network sites of the private network 104, (iv) do not have a cellular plan (e.g., a monthly plan and/or prepaid plan) for use of public networks of the wireless service provider, and/or (v) have no connectivity with public networks (e.g., macro sites) of the wireless service provider. Traffic 620 of the one or more UEs 602 of the first type "UE Type 1" is shown with solid lines in FIG. 6. The traffic 620 may pass through a Radio Access Network (RAN) 630 (e.g., a 4G and/or 5G RAN Multi-Operator Core Network (MOCN)) to a private core 634 (e.g., the private core 634 may comprise the first provisioning gateway 302, the first profile data store 304, the first HSS 306, the first PCRF 308, the first MME 312 and/or the first gateway 310). The traffic 620 may pass from the private core 634 to a router 628 that may route the traffic 620 to (i) the one or more private MEC devices 616 of the private network 104, (ii) the one or more entity applications 618 of the private network 104, and/or (iii) a WAN 638 such as the Internet.

The one or more UEs 604 of the second type "UE Type 2" may correspond to UEs that (i) have connectivity with one or more private network sites of the private network 104, (ii) are associated with (e.g., have connectivity with) a network, such as a Mobile Private Network (MPN) provided by the wireless service provider, (iii) have a cellular plan (e.g., a monthly plan and/or prepaid plan) for use of public networks of the wireless service provider, and/or (iv) have connectivity with public networks (e.g., macro sites) of the wireless service provider. Traffic 622 of the one or more UEs 604 of the second type "UE Type 2" is shown with dashed lines in FIG. 6. The traffic 622 may pass through the RAN 630 to a router 626 that may route the traffic 622 to a network 610 (e.g., a local area network associated with private Internet Protocol (IP) and/or the Internet). In some examples, the traffic 622 between the RAN 630 and the router 626 may be transmitted over a private IP (PIP), an internet protocol security (IPsec) virtual private network (VPN), and/or a WAN interface. The traffic 622 may pass from the network 610 to a macro core 640 of the wireless service provider. The macro core 640 may correspond to a public network (e.g., a macro site) of the wireless service provider (e.g., the macro core 640 may comprise at least one of a gNB, an eNB, etc. of the public network). In an example, the macro core 640 may comprise at least one of a MME, a HSS, a PCRF, a SGW, a PGW, etc. In some examples, the traffic 622 may pass from the macro core 640 to the router 628 (e.g., the traffic 622 may pass from the macro core 640 to the router 628 over a MPN provided by the wireless service provider). The router 628 may route the traffic 622 to (i) the one or more private MEC devices 616 of the private network 104, (ii) the one or more entity applications 618 of the private network 104, and/or (iii) the WAN 638 such as the Internet.

The one or more UEs 606 of the third type "UE Type 3" may correspond to UEs that (i) are public network-exclusive, (ii) have a cellular plan (e.g., a monthly plan and/or prepaid plan) for use of public networks of the wireless service provider, (iii) have connectivity with public networks (e.g., macro sites) of the wireless service provider, and/or (iv) have connectivity with on-site networks (e.g., for LTE and/or 5G coverage). Traffic 624 of the one or more UEs 606 of the third type "UE Type 3" is shown with dotted lines in FIG. 6. The traffic 624 may pass through the RAN 630 to the router 626 that may route the traffic 624 to the network 610. In some examples, the traffic 624 between the RAN 630 and the router 626 may be transmitted over a PIP, an IPsec VPN, and/or a WAN interface. The traffic 624 may pass from the network 610 to the macro core 640 of the wireless service provider. In some examples, the traffic 624 may pass from the macro core 640 to a WAN 612 such as the Internet.

Figure 7:
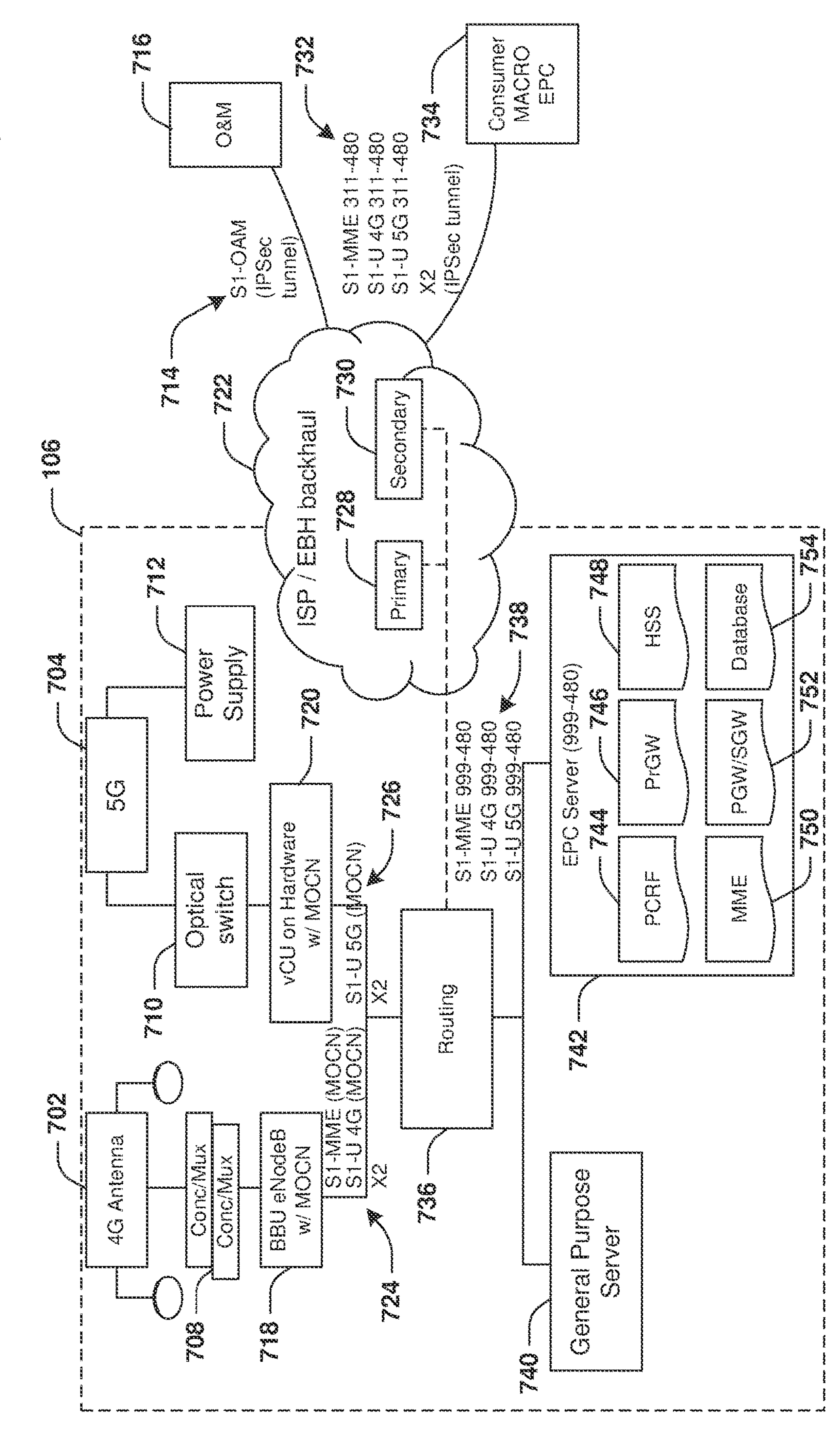
FIG. 7 is a diagram illustrating an example system comprising a private network site in accordance with an embodiment.

FIG. 7 illustrates an example of a system 701 comprising the first private network site 106. The first private network site 106 may comprise a 4G antenna 702, a 5G antenna 704 (e.g., a 5G antenna that uses millimeter-wave frequency or other available frequency), one or more concentrators and/or multiplexers 708, an optical switch 710, a Power Supply Unit (PSU) 712 (e.g., PSU6), a Baseband Unit (BBU) 718 (e.g., at least one of a BBU Evolved Node B (eNodeB), a BBU with MOON, etc.), a virtualized Central Unit (vCU) 720 (e.g., a vCU on hardware with MOON, wherein the hardware may comprise ZT Triton), a routing module 736 (e.g., at least one of a high capacity pre-aggregation and/or aggregation router, a router 6675, etc.), a General Purpose Server 740, an evolved packet core (EPC) server 742 (e.g., with network codecs 999-480), a PCRF 744 (implemented in the EPC server 742, for example), a provisioning gateway 746 (implemented in the EPC server 742, for example), an HSS 748 (implemented in the EPC server 742, for example), a MME 750 (implemented in the EPC server 742, for example), a PGW and/or SGW 752 (implemented in the EPC server 742, for example) and/or a database 754 (implemented in the EPC server 742, for example). The database 754 (e.g., a backend database) may comprise a profile data store. In an example, the 4G antenna 702 may operate with one or more frequency bands comprising B2 frequency band (e.g., 1900 megahertz) and/or B48 frequency band (e.g., 3600 megahertz). The system 701 may comprise an Operation and Maintenance component 716, an internet service provider (ISP) and/or Ethernet Backhaul (EBH) backhaul 722, a primary component 728 of the ISP and/or EBH backhaul 722, a secondary component 730 of the ISP and/or EBH backhaul 722 and/or a consumer macro EPC 734. In some examples, components of the first private network site 106 and/or the system 701 may be connected, such as in the arrangement shown in FIG. 7. In some examples, communication between the BBU 718 and the router 736 may be performed with one or more interfaces 724 (e.g., at least one of S1-MME, S1-U 4G, X2, etc.). In some examples, communication between the vCU 720 and the router 736 may be performed with one or more interfaces 726 (e.g., at least one of S1-U 5G, X2, etc.). In some examples, communication between the router 736 and the EPC server 742 may be performed with one or more interfaces 738 (e.g., at least one of S1-MME, S1-U 4G, S1-U 5G, etc.). In some examples, communication between the ISP and/or EBH backhaul 722 and the Operation and Maintenance component 716 may be performed with one or more interfaces 714 (e.g., S1-OAM) and/or may be performed over an IPSec tunnel. In some examples, communication between the ISP and/or EBH backhaul 722 and the consumer macro EPC 734 may be performed with one or more interfaces 732 (e.g., at least one of S1-MME, S1-U 4G, S1-U 5G, X2, etc.) and/or may be performed over an IPSec tunnel. In some examples, the BBU 718 and/or the router 736 may route one or more UEs of the first type "UE Type 1" and/or one or more UEs of the second type "UE Type 2" to the EPC server 742 (e.g., the EPC server 742 may correspond to a local EPC server that may comprise the first provisioning gateway 302, the first profile data store 304, the first HSS 306, the first PCRF 308, the first MME 312 and/or the first gateway 310). In some examples, the BBU 718 and/or the router 736 may route one or more UEs of the third type "UE Type 3" to the the consumer macro EPC 734 (e.g., the consumer macro EPC 734 may correspond to an EPC of a public network of the wireless service provider).

In some examples, one, some and/or all private network sites of the plurality of private network sites may be implemented and/or may operate using one or more of the techniques, configurations and/or components provided herein with respect to the first private network site 106 (such as one or more of the techniques, configurations and/or components shown in and/or described with respect to FIGS. 1-7).

Implementation of at least some of the disclosed subject matter may lead to more effective management of private network sites of the private network 104 for the entity. For example, by managing service profiles automatically using the service management gateway 102, less manual effort may be required (as compared to requiring manually provisioning service profiles to private network sites of the plurality of private network sites). Alternatively and/or additionally, by implementing the private network 104 associated with to include a plurality of private network sites across a plurality of coverage areas, wireless communication services may be provided for the entity in a more convenient manner across geographically distributed facilities of the entity (as compared to requiring that private network sites of the plurality of private network sites be separately and/or independently implemented and/or provisioned).

According to some embodiments, a method is provided. The method includes receiving service allocation information associated with a plurality of private network sites of a private network associated with an entity; determining, based upon the service allocation information, service profiles associated with a first UE, wherein the service profiles include a first service profile of wireless communication services accessible to the first UE via a first private network site of the plurality of private network sites, and a second service profile of wireless communication services accessible to the first UE via a second private network site of the plurality of private network sites; transmitting the first service profile, associated with the first UE, to the first private network site; and transmitting the second service profile, associated with the first UE, to the second private network site.

According to some embodiments, the method includes receiving, from a third private network site of the plurality of private network sites, a service query when the first UE is in a coverage area of the third private network site, wherein a profile data store of the third private network site does not include a service profile for the first UE when the service query is received; in response to receiving the service query, analyzing the service profiles associated with the first UE to identify a third service profile of wireless communication services accessible to the first UE via the third private network site; and in response to identifying the third service profile, transmitting the third service profile to the third private network site.

According to some embodiments, the method includes based upon the third service profile, the third private network site establishes a wireless communication session with the first UE and/or provides one or more wireless communication services to the first UE.

According to some embodiments, the method includes determining that the first private network site is designated a home private network site of the first UE and/or that a wireless communication session of the first private network site with the first UE is established prior to reception the service query; and after receiving the service query from the third private network site, determining whether or not there is an ongoing wireless communication session of the first private network site with the first UE.

According to some embodiments, determining whether or not there is an ongoing wireless communication session of the first private network site with the first UE is performed after or concurrently with transmitting the third service profile to the third private network site, and/or establishment, by the third private network site, of a wireless communication session with the first UE.

According to some embodiments, the method includes in response to a determination that there is an ongoing wireless communication session of the first private network site with the first UE, transmitting an instruction, to the first private network site, to terminate the ongoing wireless communication session and/or disconnect from the first UE; after transmitting the instruction, determining whether or not a new wireless communication session of the first private network site with the first UE is established; and determining whether or not the ongoing wireless communication session was a stale wireless communication session based upon the determination of whether or not a new wireless communication session of the first private network site with the first UE is established.

According to some embodiments, the method includes in response to determining that the ongoing wireless communication session was not a stale wireless communication session: blacklisting an identifier associated with the first UE; and/or transmitting an instruction, to the third private network site, to not establish or to terminate a wireless communication session of the third private network site with the first UE.

According to some embodiments, the method includes receiving, from a third private network site of the plurality of private network sites, a service query when the first UE is in a coverage area of the third private network site, wherein a profile data store of the third private network site does not include a service profile for the first UE when the service query is received; in response to receiving the service query, analyzing the service profiles associated with the first UE and determining that the service profiles do not include a service profile associated with the first UE and the third private network site; and in response to determining that the service profiles do not include a service profile associated with the first UE and the third private network site: transmitting a default service profile to the third private network site; transmitting an indication, to the third private network site, that a service profile associated with the first UE and the third private network site is not available; or not transmitting a response to the service query.

According to some embodiments, one or more first wireless communication services provided by the first private network site to the first UE are based upon the first service profile, and/or one or more second wireless communication services provided by the second private network site to the first UE are based upon the second service profile.

According to some embodiments, the first private network site is associated with a first coverage area, and the second private network site is associated with a second coverage area, wherein the one or more first wireless communication services are provided by the first private network site to the first UE when the first UE is in the first coverage area, and/or the one or more second wireless communication services are provided by the second private network site to the first UE when the first UE is in the second coverage area.

According to some embodiments, the first service profile is indicative of a first priority of wireless communication service for the first UE, a first speed of wireless communication service for the first UE, a first Quality of Service (QoS) of wireless communication service for the first UE, and/or a first level of access, of the first UE, to resources of the first private network site. The second service profile is indicative of a second priority of wireless communication service for the first UE, a second speed of wireless communication service for the first UE, a second QoS of wireless communication service for the first UE, and/or a second level of access, of the first UE, to resources of the second private network site.

According to some embodiments, a system is provided. The method includes a service management gateway configured to determine, based upon service allocation information associated with a plurality of private network sites of a private network associated with an entity, service profiles associated with a first UE, wherein the service profiles include a first service profile of wireless communication services accessible to the first UE via a first private network site of the plurality of private network sites, and a second service profile of wireless communication services accessible to the first UE via a second private network site of the plurality of private network sites; transmit the first service profile, associated with the first UE, to the first private network site; and transmit an indication of the second service profile, associated with the first UE, to the second private network site.

According to some embodiments, the first private network site is configured to detect the first UE in a coverage area of the first private network site; retrieve the first service profile for the first UE from a first profile data store of the first private network site; and establish a wireless communication session, with the first UE, in which the first private network site provides one or more first wireless communication services to the first UE based upon the first service profile.

According to some embodiments, a third private network site of the plurality of private network sites is configured to detect the first UE in a coverage area of the third private network site; in response to detecting the first UE, determine whether or not a profile data store of the third private network site includes a service profile for the first UE; and based upon a determination that the profile data store does not include a service profile for the first UE, transmit a service query to the service management gateway.

According to some embodiments, the service management gateway is configured to receive the service query from the third private network site; in response to receiving the service query, identify, from among the service profiles associated with the first UE, a third service profile of wireless communication services accessible to the first UE via the third private network site; and in response to identifying the third service profile, transmit the third service profile to the third private network site.

According to some embodiments, the third private network site is configured to establish a wireless communication session with the first UE; and provide one or more wireless communication services to the first UE based upon the third service profile.

According to some embodiments, the service management gateway is configured to receive the service query from the third private network site; in response to receiving the service query, analyze the service profiles associated with the first UE and determine that the service profiles do not include a service profile associated with the first UE and the third private network site; and in response to determining that the service profiles do not include a service profile associated with the first UE and the third private network site: transmit a default service profile to the third private network site; transmit an indication, to the third private network site, that a service profile associated with the first UE and the third private network site is not available; or not transmit a response to the service query.

According to some embodiments, a private network site is provided. The method includes a processor coupled to memory, the processor configured to execute instructions to perform operations including receiving, from a service management gateway, a plurality of service profiles associated with a plurality of UEs, wherein the plurality of service profiles include a first service profile of wireless communication services accessible to a first UE via the private network site, and a second service profile of wireless communication services accessible to a second UE via the private network site; storing the plurality of service profiles on a profile data store of the private network site; detecting the first UE in a coverage area of the private network site; in response to detecting the first UE, retrieving, from the profile data store, the first service profile for the first UE; providing one or more first wireless communication services, to the first UE, based upon the first service profile; detecting a third UE in the coverage area of the private network site; in response to detecting the third UE, determining whether or not the profile data store includes a service profile for the third UE; and based upon a determination that the profile data store does not include a service profile for the third UE, transmitting a service query to the service management gateway.

According to some embodiments, the operations include receiving, from the service management gateway, a third service profile of wireless communication services accessible to the third UE via the private network site; and providing one or more wireless communication services to the third UE based upon the third service profile.

According to some embodiments, the operations include determining that a service profile associated with the third UE and the private network site is not available or the third UE is blacklisted based upon an indication, from the service management gateway, that a service profile associated with the third UE and the private network site is not available, an indication, from the service management gateway, that the third UE is blacklisted, and/or not receiving a response, to the service query, within a response window after transmitting the service query; and based upon the determination that a service profile associated with the third UE and the private network site is not available and/or the third UE is blacklisted: not establishing a wireless communication session with the third UE, terminating a wireless communication session with the third UE, and/or blocking access of the third UE to one or more wireless communication services.

Figure 8:
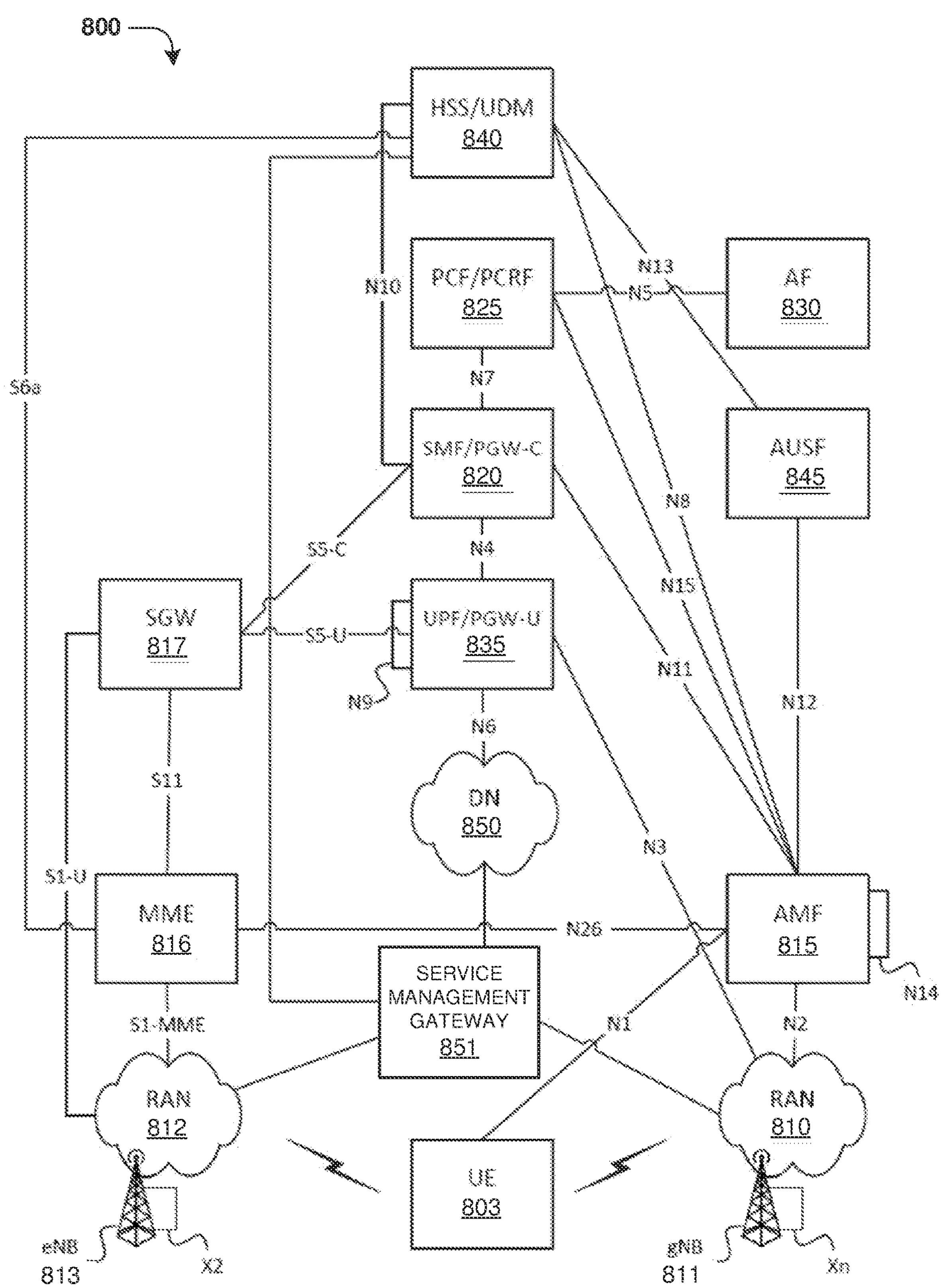
FIG. 8 is an illustration of an example environment in which at least a portion of the techniques presented herein may be utilized and/or implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, the private network 104 and/or a private network site of the private network 104 (e.g., each private network site of one, some and/or all of the plurality of private network sites of the private network 104) may be implemented using techniques, configurations and/or components shown in and/or described with respect to FIG. 8. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 803, RAN 810 (which may include one or more Next Generation Node Bs ("gNBs") 811), RAN 812 (which may include one or more one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as service management gateway 851.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively and/or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 803 may include a computation and communication device, such as a wireless mobile communication device that is capable of communicating with RAN 810, RAN 812, and/or DN 850. UE 803 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 803 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 803 may communicate with one or more other elements of environment 800. UE 803 may communicate with RAN 810 via an air interface (e.g., as provided by gNB 811). For instance, RAN 810 may receive traffic (e.g., voice call traffic, data traffic, messaging traffic, signaling traffic, etc.) from UE 803 via the air interface, and may communicate the traffic to UPF/PGW-U 835, and/or one or more other devices or networks. Similarly, RAN 810 may receive traffic intended for UE 803 (e.g., from UPF/PGW-U 835, AMF 815, and/or one or more other devices or networks) and may communicate the traffic to UE 803 via the air interface.

RAN 812 may be, or may include, a LTE RAN that includes one or more base stations (e.g., one or more eNBs 813), via which UE 803 may communicate with one or more other elements of environment 800. UE 803 may communicate with RAN 812 via an air interface (e.g., as provided by eNB 813). For instance, RAN 810 may receive traffic (e.g., voice call traffic, data traffic, messaging traffic, signaling traffic, etc.) from UE 803 via the air interface, and may communicate the traffic to UPF/PGW-U 835, and/or one or more other devices or networks. Similarly, RAN 810 may receive traffic intended for UE 803 (e.g., from UPF/PGW-U 835, SGW 817, and/or one or more other devices or networks) and may communicate the traffic to UE 803 via the air interface.

AMF 815 may include one or more devices, systems, Virtualized Network Functions ("VNFs"), etc., that perform operations to register UE 803 with the 5G network, to establish bearer channels associated with a session with UE 803, to hand off UE 803 from the 5G network to another network, to hand off UE 803 from the other network to the 5G network, manage mobility of UE 803 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 803 with the EPC, to establish bearer channels associated with a session with UE 803, to hand off UE 803 from the EPC to another network, to hand off UE 803 from another network to the EPC, manage mobility of UE 803 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 803. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 803, from DN 850, and may forward the user plane data toward UE 803 (e.g., via RAN 810, SMF/PGW-C 820, and/or one or more other devices). In some embodiments, multiple UPFs 835 may be deployed (e.g., in different geographical locations), and the delivery of content to UE 803 may be coordinated via the N9 interface (e.g., as denoted in FIG. 8 by the line marked "N9" originating and terminating at UPF/PGW-U 835). Similarly, UPF/PGW-U 835 may receive traffic from UE 803 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 803.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 803 may communicate, through DN 850, with data servers, other UEs UE 803, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 803 may communicate.

The service management gateway 851 may include one or more devices, systems, VNFs, etc., that perform one or more operations described herein. For example, the service management gateway 851 may manage services and/or service profiles of UEs and/or private network sites.

Figure 9:
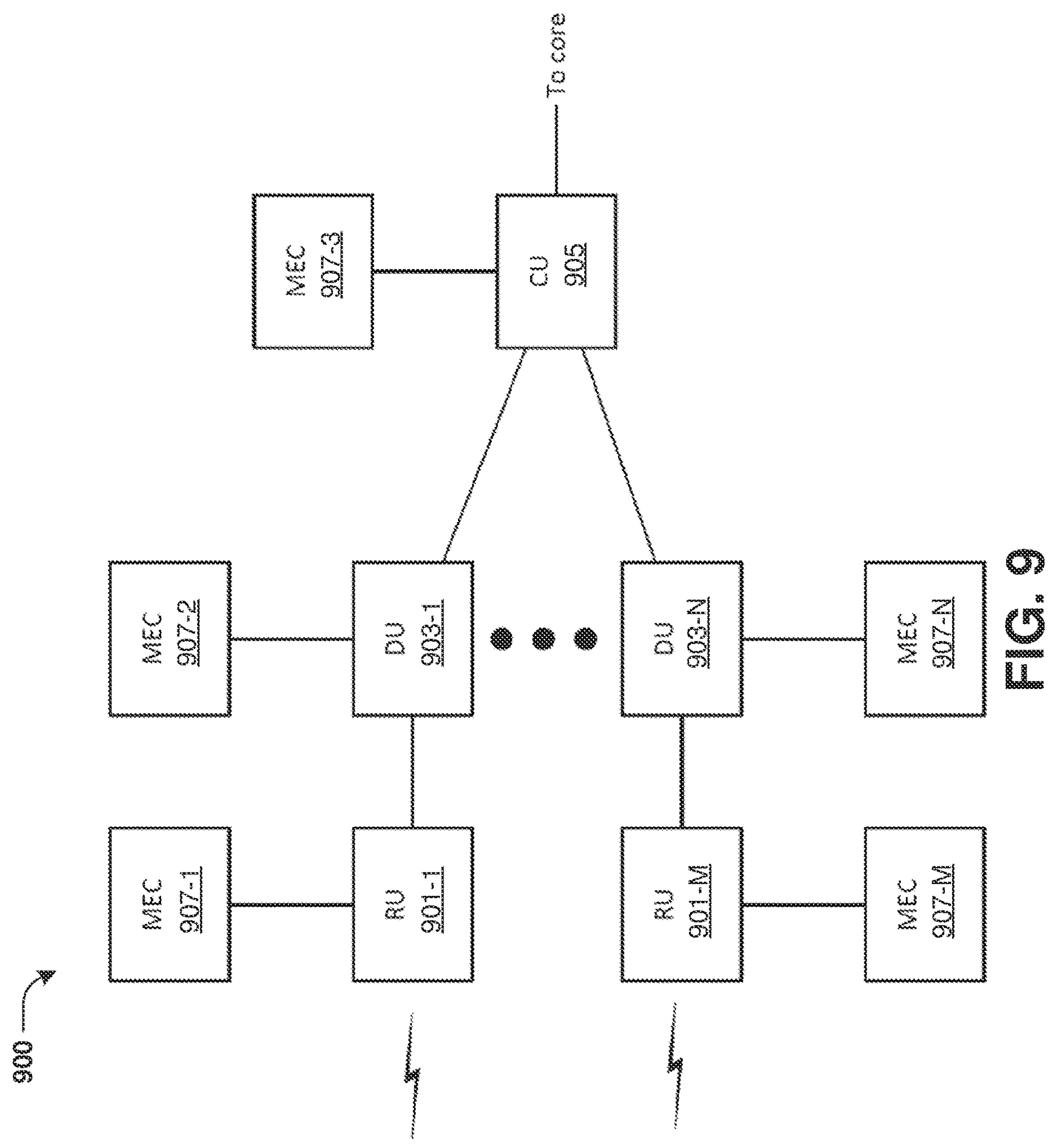
FIG. 9 is an illustration of an example network that may utilize and/or implement at least a portion of the techniques presented herein.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs UE 803 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based upon the RLC packets) on the traffic received from DUs 903.

In accordance with some embodiments, CU 905 may receive downlink traffic (e.g., traffic from the core network) for a particular UE 803, and may determine which DU(s) 903 should receive the downlink traffic. DU 903 may include one or more devices that transmit traffic between a core network (e.g., via CU 905) and UE 803 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 803.

RU 901 may include hardware circuitry (e.g., one or more RF transceivers, antennas, radios, and/or other suitable hardware) to communicate wirelessly (e.g., via an RF interface) with one or more UEs UE 803, one or more other DUs 903 (e.g., via RUs 901 associated with DUs 903), and/or any other suitable type of device. In the uplink direction, RU 901 may receive traffic from UE 803 and/or another DU 903 via the RF interface and may provide the traffic to DU 903. In the downlink direction, RU 901 may receive traffic from DU 903, and may provide the traffic to UE 803 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 803, via a respective RU 901.

For example, RU 901-1 may route some traffic, from UE 803, to MEC 907-1 instead of to a core network (e.g., via DU 903 and CU 905). MEC 907-1 may process the traffic, perform one or more computations based upon the received traffic, and may provide traffic to UE 803 via RU 901-1. In this manner, ultra-low latency services may be provided to UE 803, as traffic does not need to traverse DU 903, CU 905, and an intervening backhaul network between DU network 900 and the core network. In some embodiments, MEC 907 may include, and/or may implement some or all of the functionality described above with respect to the service management gateway 851, the service management gateway 102, one or more private MEC devices 616 and/or the one or more entity applications 618.

Figure 10:
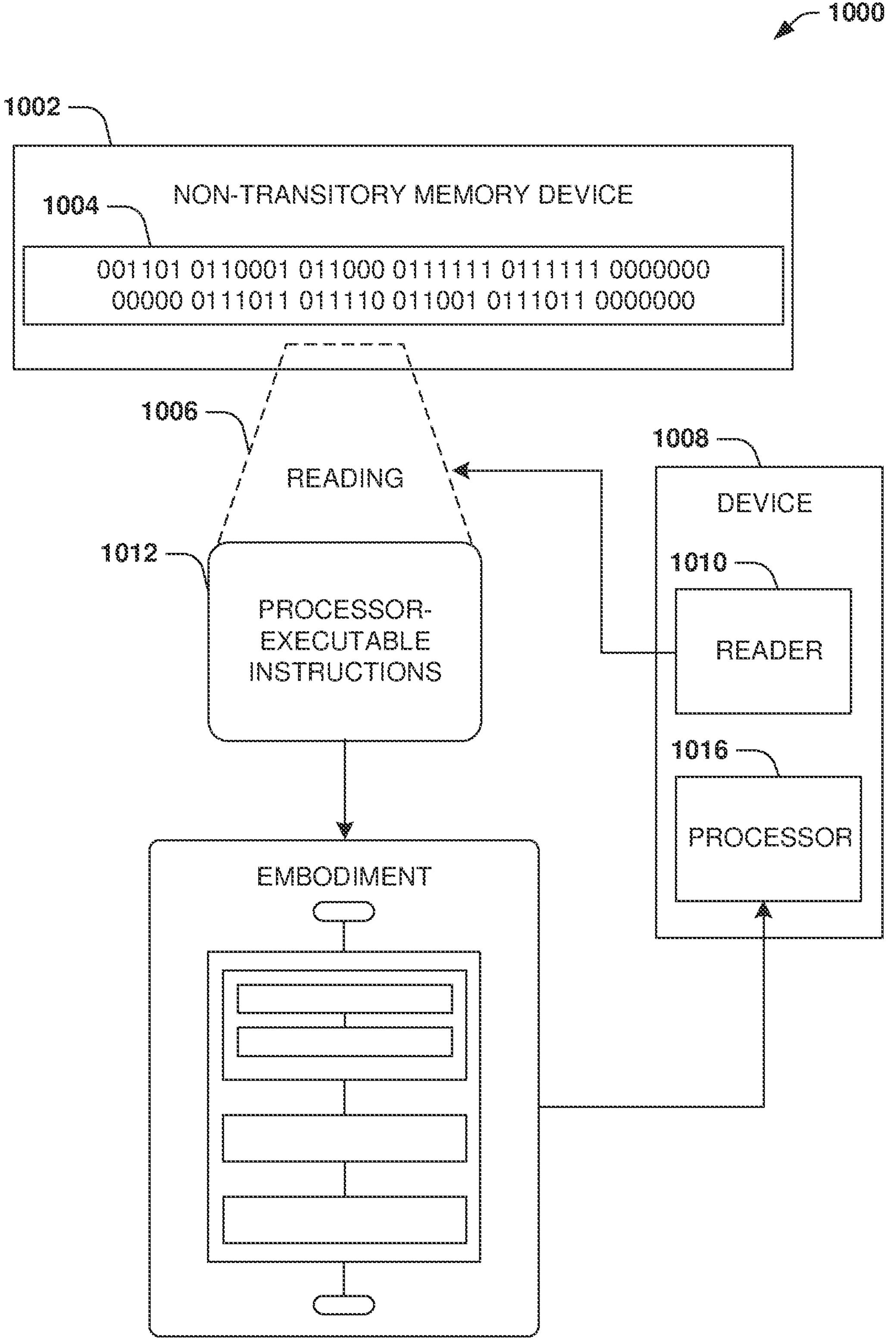
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 200 of FIG. 2, the example method 400 of FIG. 4 and/or the example method 500 of FIG. 5, for example. In some embodiments, the processor-executable instructions 1012 are configured to cause implementation of a system, such as at least some of the example system 101 of FIG. 1, the example system 301 of FIG. 3, the example system 601 of FIG. 6 and/or the example system 701 of FIG. 7, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A service management gateway-implemented method for managing a private network, of an entity, comprising a plurality of private network sites deployed at geographically distributed facilities of the entity, the method comprising:

receiving, by the service management gateway, service allocation information associated with the plurality of private network sites of the private network of the entity;

determining, by the service management gateway and based upon the service allocation information, service profiles associated with a first user equipment (UE), wherein the service profiles comprise:

a first service profile of wireless communication services accessible to the first UE via a first private network site of the plurality of private network sites, wherein the first service profile provides for the first UE receiving a higher level of service at the first private network site than one or more other service profiles provide for the first UE receiving at other network sites of the plurality of private network sites based upon the first private network site being designated a home private network site of the first UE by the service management gateway; and a second service profile of wireless communication services accessible to the first UE via a second private network site of the plurality of private network sites; and automatically provisioning, by the service management gateway, the service profiles associated with the first UE to the plurality of private network sites, comprising:

transmitting, by the service management gateway, the first service profile, associated with the first UE, to a first provisioning gateway of the first private network site for storage on a first profile data store of the first private network site; and transmitting, by the service management gateway, the second service profile, associated with the first UE, to a second provisioning gateway of the second private network site for storage on a second profile data store of the second private network site.

2. The method of claim 1, comprising:

receiving, from a third private network site of the plurality of private network sites, a service query when the first UE is in a coverage area of the third private network site, wherein a profile data store of the third private network site does not comprise a service profile for the first UE when the service query is received;

in response to receiving the service query, analyzing the service profiles associated with the first UE to identify a third service profile of wireless communication services accessible to the first UE via the third private network site; and in response to identifying the third service profile, transmitting the third service profile to the third private network site.

3. The method of claim 2, wherein, based upon the third service profile, the third private network site at least one of:

establishes a wireless communication session with the first UE; or provides one or more wireless communication services to the first UE.

4. The method of claim 2, comprising:

determining that at least one of:

the first private network site is designated a home private network site of the first UE; or a wireless communication session of the first private network site with the first UE is established prior to reception the service query; and after receiving the service query from the third private network site, determining whether or not there is an ongoing wireless communication session of the first private network site with the first UE.

5. The method of claim 4, wherein:

determining whether or not there is an ongoing wireless communication session of the first private network site with the first UE is performed after or concurrently with at least one of:

transmitting the third service profile to the third private network site; or establishment, by the third private network site, of a wireless communication session with the first UE.

6. The method of claim 4, comprising:

in response to a determination that there is an ongoing wireless communication session of the first private network site with the first UE, transmitting an instruction, to the first private network site, to at least one of terminate the ongoing wireless communication session or disconnect from the first UE;

after transmitting the instruction, determining whether or not a new wireless communication session of the first private network site with the first UE is established; and determining whether or not the ongoing wireless communication session was a stale wireless communication session based upon the determination of whether or not a new wireless communication session of the first private network site with the first UE is established.

7. The method of claim 6, comprising:

in response to determining that the ongoing wireless communication session was not a stale wireless communication session, at least one of:

blacklisting an identifier associated with the first UE; or transmitting an instruction, to the third private network site, to not establish or to terminate a wireless communication session of the third private network site with the first UE.

8. The method of claim 1, comprising:

receiving, from a third private network site of the plurality of private network sites, a service query when the first UE is in a coverage area of the third private network site, wherein a profile data store of the third private network site does not comprise a service profile for the first UE when the service query is received;

in response to receiving the service query, analyzing the service profiles associated with the first UE and determining that the service profiles do not comprise a service profile associated with the first UE and the third private network site; and in response to determining that the service profiles do not comprise a service profile associated with the first UE and the third private network site, one of:

transmitting a default service profile to the third private network site;

transmitting an indication, to the third private network site, that a service profile associated with the first UE and the third private network site is not available; or not transmitting a response to the service query.

9. The method of claim 1, wherein at least one of:

one or more first wireless communication services provided by the first private network site to the first UE are based upon the first service profile; or one or more second wireless communication services provided by the second private network site to the first UE are based upon the second service profile.

10. The method of claim 9, wherein:

the first private network site is associated with a first coverage area;

the second private network site is associated with a second coverage area; and at least one of:

the one or more first wireless communication services are provided by the first private network site to the first UE when the first UE is in the first coverage area; or the one or more second wireless communication services are provided by the second private network site to the first UE when the first UE is in the second coverage area.

11. The method of claim 1, wherein:

the first service profile is indicative of at least one of:

a first priority of wireless communication service for the first UE;

a first speed of wireless communication service for the first UE;

a first Quality of Service (QoS) of wireless communication service for the first UE; or a first level of access, of the first UE, to resources of the first private network site; and the second service profile is indicative of at least one of:

a second priority of wireless communication service for the first UE;

a second speed of wireless communication service for the first UE;

a second QoS of wireless communication service for the first UE; or a second level of access, of the first UE, to resources of the second private network site.

12. The method of claim 1, wherein receiving the service allocation information comprises receiving the service allocation information from a dashboard system during an onboarding process for configuring the private network and the plurality of private network sites.

13. The method of claim 1, wherein the first provisioning gateway communicates with the first profile data store using a directory service protocol.

14. The method of claim 1, wherein the first profile data store communicates with a home subscriber server (HSS) via a messaging protocol.

15. The method of claim 1, wherein the first profile data store communicates with a policy and charging rules function (PCRF) via at least one of an application protocol or a messaging protocol.

16. A system, comprising:

a service management gateway configured to:

determine, based upon service allocation information associated with a plurality of private network sites of a private network associated with an entity, service profiles associated with a first user equipment (UE), wherein the service profiles comprise:

a first service profile of wireless communication services accessible to the first UE via a first private network site of the plurality of private network sites; and a second service profile of wireless communication services accessible to the first UE via a second private network site of the plurality of private network sites;

transmit the first service profile, associated with the first UE, to the first private network site;

transmit an indication of the second service profile, associated with the first UE, to the second private network site;

receive, from a third private network site of the plurality of private network sites, a service query when the first UE is in a coverage area of the third private network site, wherein a profile data store of the third private network site does not comprise a service profile for the first UE when the service query is received;

in response to receiving the service query, analyze the service profiles associated with the first UE to identify a third service profile of wireless communication services accessible to the first UE via the third private network site;

in response to identifying the third service profile, transmit the third service profile to the third private network site determine that at least one of:

the first private network site is designated a home private network site of the first UE; or a wireless communication session of the first private network site with the first UE is established prior to reception the service query; and after receiving the service query from the third private network site, determine whether or not there is an ongoing wireless communication session of the first private network site with the first UE;

in response to a determination that there is an ongoing wireless communication session of the first private network site with the first UE, transmit an instruction, to the first private network site, to at least one of terminate the ongoing wireless communication session or disconnect from the first UE;

after transmitting the instruction, determine whether or not a new wireless communication session of the first private network site with the first UE is established; and determine whether or not the ongoing wireless communication session was a stale wireless communication session based upon the determination of whether or not a new wireless communication session of the first private network site with the first UE is established.

17. The system of claim 16, wherein the plurality of private network sites are deployed at geographically distributed facilities of the same entity.

18. A private network site of a plurality of private network sites deployed at geographically distributed facilities of a same entity, the private network site comprising:

a processor coupled to memory, the processor configured to execute instructions to perform operations comprising:

receiving, from a service management gateway and via a provisioning gateway of the private network site, a plurality of service profiles associated with a plurality of user equipments (UEs), wherein the plurality of service profiles comprise:

a first service profile of wireless communication services accessible to a first UE via the private network site; and a second service profile of wireless communication services accessible to a second UE via the private network site;

storing, by the provisioning gateway, the plurality of service profiles on a profile data store of the private network site, wherein the provisioning gateway communicates with the profile data store using an application protocol, and the first service profile provides for the first UE receiving a higher level of service at the private network site than at a second private network site based upon the private network site being designated a home private network site of the first UE, wherein the second service profile provides for the second UE receiving a lower level of service at the private network site than at the second private network site based upon the second private network site being designated a home private network site of the second UE;

detecting the first UE in a coverage area of the private network site;

in response to detecting the first UE, retrieving, from the profile data store, the first service profile for the first UE;

providing one or more first wireless communication services, to the first UE, based upon the first service profile;

detecting a third UE in the coverage area of the private network site;

in response to detecting the third UE, determining whether or not the profile data store comprises a service profile for the third UE; and based upon a determination that the profile data store does not comprise a service profile for the third UE, transmitting a service query to the service management gateway.

19. The private network site of claim 18, the operations comprising:

receiving, from the service management gateway, a third service profile of wireless communication services accessible to the third UE via the private network site; and providing one or more wireless communication services to the third UE based upon the third service profile.

20. The private network site of claim 18, the operations comprising:

determining that at least one of a service profile associated with the third UE and the private network site is not available or the third UE is blacklisted based upon at least one of:

an indication, from the service management gateway, that a service profile associated with the third UE and the private network site is not available;

an indication, from the service management gateway, that the third UE is blacklisted; or not receiving a response, to the service query, within a response window after transmitting the service query; and based upon the determination that at least one of a service profile associated with the third UE and the private network site is not available or the third UE is blacklisted, at least one of:

not establishing a wireless communication session with the third UE;

terminating a wireless communication session with the third UE; or blocking access of the third UE to one or more wireless communication services.

* * * * *